United States Patent
Asai

(10) Patent No.: US 11,108,772 B2
(45) Date of Patent: *Aug. 31, 2021

(54) SERVICE PROVIDING SYSTEM, SERVICE DELIVERY SYSTEM, SERVICE PROVIDING METHOD, AND NON-TRANSITORY RECORDING MEDIUM

(71) Applicant: Takahiro Asai, Kanagawa (JP)

(72) Inventor: Takahiro Asai, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 161 days.

This patent is subject to a terminal disclaimer.

(21) Appl. No.: 16/136,337

(22) Filed: Sep. 20, 2018

(65) Prior Publication Data
US 2019/0020654 A1   Jan. 17, 2019

Related U.S. Application Data

(63) Continuation of application No. PCT/JP2017/012103, filed on Mar. 24, 2017.

(30) Foreign Application Priority Data

Mar. 29, 2016  (JP) .............................. JP2016-066335

(51) Int. Cl.
*H04L 29/06* (2006.01)
*H04M 3/42* (2006.01)
(Continued)

(52) U.S. Cl.
CPC .......... *H04L 63/0876* (2013.01); *G06F 21/31* (2013.01); *G06F 21/44* (2013.01);
(Continued)

(58) Field of Classification Search
CPC .............. H04L 63/0876; H04L 63/083; H04L 63/0884; G06F 21/31; G06F 21/44; H04M 3/42; H04M 11/00; H04W 12/06
(Continued)

(56) References Cited

U.S. PATENT DOCUMENTS 6,640,301 B1 * 10/2003 Ng ....................... G06Q 10/107
                                                         705/14.73
7,120,928 B2 * 10/2006 Sheth .................... G06F 16/954
                                                              726/4
(Continued)

FOREIGN PATENT DOCUMENTS

CN       103973874 A     8/2014
CN       104765990 A     7/2015
(Continued)

OTHER PUBLICATIONS

International Search Report dated Jun. 6, 2017 in PCT/JP2017/009995 filed on Mar. 13, 2017 (with English translation).
(Continued)

*Primary Examiner* — Shahriar Zarrineh
(74) *Attorney, Agent, or Firm* — Harness, Dickey & Pierce, P.L.C.

(57) ABSTRACT

A processor associates with one another terminal identifiers for identifying terminals. Each terminal identifier includes a to-be-authenticated section common to the terminal identifiers and used to authenticate a user. The processor associates the terminal identifiers with one another as respective terminal identifiers for a communication source and a communication destination that can perform communication with the communication source. Upon receiving from a first terminal as a communication source a first terminal identifier for identifying the first terminal and a second terminal identifier for identifying a second terminal as a communication destination, the processor transmits a request to the second terminal to start communication with the first terminal for a case where the first and second terminal identifiers are associated with one another. Otherwise the processor does not transmit a request to the second terminal to start communication with the first terminal.

11 Claims, 22 Drawing Sheets

(51) Int. Cl.
*H04M 11/00* (2006.01)
*G06F 21/31* (2013.01)
*G06F 21/44* (2013.01)
*H04W 12/06* (2021.01)

(52) U.S. Cl.
CPC ........ *H04L 63/083* (2013.01); *H04L 63/0884* (2013.01); *H04M 3/42* (2013.01); *H04M 11/00* (2013.01); *H04W 12/06* (2013.01)

(58) Field of Classification Search
USPC .......................................................... 726/7
See application file for complete search history.

(56) References Cited

U.S. PATENT DOCUMENTS

| | | | |
|---|---|---|---|
| 7,437,457 B1 | 10/2008 | Eisendrath et al. | |
| 7,908,647 B1* | 3/2011 | Polis | H04L 63/083 726/5 |
| 7,979,912 B1 | 7/2011 | Roka | |
| 8,023,927 B1* | 9/2011 | Coleman | H04L 63/083 455/410 |
| 8,281,372 B1* | 10/2012 | Vidal | H04L 51/12 726/5 |
| 8,347,093 B1* | 1/2013 | Ahmed | G06F 21/31 713/168 |
| 8,713,148 B2 | 4/2014 | Imai et al. | |
| 8,959,234 B2 | 2/2015 | Lee et al. | |
| 8,959,650 B1 | 2/2015 | Richards et al. | |
| 9,131,104 B2 | 9/2015 | Nakafuji et al. | |
| 9,172,682 B2* | 10/2015 | Bollay | H04L 63/061 |
| 9,210,375 B2 | 12/2015 | Asai | |
| 9,246,906 B1* | 1/2016 | Zhou | H04L 61/1523 |
| 9,270,942 B2 | 2/2016 | Asai | |
| 9,350,947 B2 | 5/2016 | Asai | |
| 9,391,996 B1 | 7/2016 | Chin et al. | |
| 9,432,623 B2 | 8/2016 | Nagase et al. | |
| 9,697,363 B1 | 7/2017 | Dorwin | |
| 9,906,570 B2 | 2/2018 | Hinohara et al. | |
| 2002/0034301 A1 | 3/2002 | Andersson | |
| 2003/0065919 A1 | 4/2003 | Albert et al. | |
| 2003/0163730 A1* | 8/2003 | Roskind | H04L 63/083 726/5 |
| 2003/0216143 A1 | 11/2003 | Roese et al. | |
| 2004/0003287 A1* | 1/2004 | Zissimopoulos | H04L 63/083 726/10 |
| 2004/0054735 A1* | 3/2004 | Daniell | H04L 69/18 709/206 |
| 2004/0088424 A1 | 5/2004 | Park et al. | |
| 2004/0148500 A1* | 7/2004 | Olkin | H04L 63/062 713/150 |
| 2004/0187018 A1 | 9/2004 | Owen et al. | |
| 2004/0243832 A1* | 12/2004 | Wilf | H04L 63/08 726/4 |
| 2005/0055547 A1* | 3/2005 | Kawamura | G06F 21/31 713/155 |
| 2005/0097179 A1* | 5/2005 | Orme | H04L 51/12 709/207 |
| 2005/0108520 A1 | 5/2005 | Yamamoto et al. | |
| 2005/0144279 A1* | 6/2005 | Wexelblat | G06Q 30/06 709/225 |
| 2006/0015609 A1 | 1/2006 | Hagale et al. | |
| 2006/0109839 A1 | 5/2006 | Hino et al. | |
| 2006/0206616 A1 | 9/2006 | Brown | |
| 2008/0133735 A1* | 6/2008 | Thayer | H04L 67/02 709/223 |
| 2008/0235788 A1 | 9/2008 | Walter et al. | |
| 2009/0037981 A1 | 2/2009 | Kino | |
| 2009/0070858 A1* | 3/2009 | Hiraide | H04L 63/18 726/4 |
| 2009/0187979 A1* | 7/2009 | Sever | H04L 61/1547 726/5 |
| 2010/0121954 A1 | 5/2010 | Yang et al. | |
| 2010/0125895 A1 | 5/2010 | Shull et al. | |
| 2010/0235471 A1* | 9/2010 | Parikh | H04L 43/065 709/219 |
| 2010/0250929 A1* | 9/2010 | Schultz | H04L 63/18 713/168 |
| 2010/0281520 A1 | 11/2010 | Deguchi | |
| 2011/0004919 A1* | 1/2011 | Chawla | H04L 63/0236 726/3 |
| 2011/0016322 A1* | 1/2011 | Dean | H04L 63/061 713/171 |
| 2011/0145907 A1* | 6/2011 | Chua | H04L 63/0807 726/7 |
| 2012/0036364 A1 | 2/2012 | Yoneda et al. | |
| 2012/0174196 A1 | 7/2012 | Bhogavilli et al. | |
| 2013/0024679 A1 | 1/2013 | Isozaki | |
| 2013/0031359 A1 | 1/2013 | Laidlaw et al. | |
| 2013/0055368 A1* | 2/2013 | Bauckman | H04L 51/12 726/7 |
| 2013/0061298 A1 | 3/2013 | Longobardi et al. | |
| 2013/0067115 A1 | 3/2013 | Lapanc | |
| 2013/0139234 A1 | 5/2013 | Inbaraj et al. | |
| 2013/0155444 A1* | 6/2013 | Bae | H04L 67/306 358/1.14 |
| 2013/0185230 A1* | 7/2013 | Zhu | H04L 51/12 706/12 |
| 2013/0298031 A1 | 11/2013 | Kanda et al. | |
| 2014/0007209 A1* | 1/2014 | Zucker | H04W 12/04 726/7 |
| 2014/0077937 A1 | 3/2014 | Kato et al. | |
| 2014/0123264 A1 | 5/2014 | Shull et al. | |
| 2014/0172708 A1* | 6/2014 | Chrapko | H04L 67/02 705/44 |
| 2014/0189058 A1 | 7/2014 | Asai | |
| 2014/0240448 A1 | 8/2014 | Kanda et al. | |
| 2014/0240449 A1 | 8/2014 | Hinohara et al. | |
| 2014/0240770 A1 | 8/2014 | Hinohara et al. | |
| 2014/0282963 A1* | 9/2014 | Wildermuth | H04W 4/02 726/7 |
| 2014/0282979 A1 | 9/2014 | Andon | |
| 2015/0040188 A1 | 2/2015 | Takeuchi | |
| 2015/0074615 A1* | 3/2015 | Han | H04L 63/0861 715/863 |
| 2015/0103678 A1* | 4/2015 | Fisbein | H04W 12/06 370/252 |
| 2015/0106732 A1 | 4/2015 | Kandori et al. | |
| 2015/0128240 A1* | 5/2015 | Richards | H04L 63/0861 726/7 |
| 2015/0173501 A1* | 6/2015 | Scott | A46B 5/0095 15/145 |
| 2015/0282233 A1 | 10/2015 | Homma et al. | |
| 2015/0319100 A1 | 11/2015 | Asai | |
| 2015/0341298 A1* | 11/2015 | Blinn | H04L 51/18 709/206 |
| 2015/0341335 A1 | 11/2015 | Camenisch et al. | |
| 2015/0350205 A1* | 12/2015 | Oyman | H04L 67/02 726/7 |
| 2015/0379302 A1* | 12/2015 | Smith | H04L 63/0407 726/26 |
| 2016/0050565 A1 | 2/2016 | Benoit et al. | |
| 2016/0071407 A1 | 3/2016 | Toebes et al. | |
| 2016/0092947 A1 | 3/2016 | Nagase et al. | |
| 2016/0099947 A1 | 4/2016 | Asai et al. | |
| 2016/0267260 A1 | 9/2016 | Jiang et al. | |
| 2016/0269390 A1 | 9/2016 | Endo et al. | |
| 2016/0277930 A1* | 9/2016 | Li | H04W 12/06 |
| 2017/0123264 A1 | 5/2017 | Li | G02F 1/136259 |
| 2017/0279792 A1* | 9/2017 | Tse | H04L 63/0807 |
| 2019/0075460 A1 | 3/2019 | Sakamoto et al. | |

FOREIGN PATENT DOCUMENTS

| | | | |
|---|---|---|---|
| EP | 2765753 | A1 | 8/2014 |
| EP | 2849436 | A2 | 3/2015 |
| EP | 3068154 | A1 | 9/2016 |
| JP | 2007-110377 | A | 4/2007 |
| JP | 2009-070020 | | 4/2009 |
| JP | 2010-068294 | A | 3/2010 |
| JP | 2011-133951 | | 7/2011 |

(56) References Cited

FOREIGN PATENT DOCUMENTS

| JP | 2013-235434 | | 11/2013 |
| JP | 2014-057221 | A | 3/2014 |
| JP | 2014-060552 | | 4/2014 |
| JP | 2014-134978 | | 7/2014 |
| JP | 2014-155128 | | 8/2014 |
| JP | 2015-018318 | | 1/2015 |
| JP | 2015-049609 | | 3/2015 |
| JP | 2015-201827 | | 11/2015 |

OTHER PUBLICATIONS

International Search Report dated Jun. 6, 2017 in PCT/JP2017/012042 filed on Mar. 24, 2017 (with English translation).
International Search Report dated Jun. 6, 2017 in PCT/JP2017/012040 filed on Mar. 24, 2017 (with English translation).
International Search Report dated Jun. 27, 2017 in PCT/JP2017/012103 filed on Mar. 24, 2017 (with English translation).
International Search Report PCT/ISA/210 for International Application No. PCT/JP2017/012103 dated Jun. 27, 2017.
Written Opinion of the International Searching Authority PCT/ISA/237 for International Application No. PCT/JP2017/012103 dated Jun. 27, 2017.
Anonymous: "Personal area network", Wikipedia, Feb. 27, 2016, XP055550441, https://en.wikipedia.org/w/index.php?title=Personal_area_network&oldid=707172489 [retrieved on Feb. 1, 2019]. pp. 2, line 20-p. 2, line 27.
Extended Search Report for corresponding European Application No. 17774774.8 dated Feb. 13, 2019.
Extended Search Report for corresponding European Application No. 17774772.2 dated Feb. 14, 2019.
U.S. Office Action for corresponding U.S. Appl. No. 16/142,403 dated Apr. 27, 2020.
Extended European Search Report dated Feb. 27, 2019.
U.S. Office Action for corresponding U.S. Appl. No. 16/142,403 dated Nov. 22, 2019.
Butkus, P.,"Identity Management in M2M Networks," https://pdfs.semanticscholar.org/8a37/108bd92287650722ad8953f87c77d04f33.pdf, Jun. 26, 2014.
Anonymous, "Social login—Wikipedia," https://en.wikipedia.org/w/index.php?title=Social_login&oldid=697290822, Dec. 29, 2015.
Anonymous, "Session Management Cheet Sheet—OWASP," https://web/archive.org/web/20160119164955/https://ww.w.owasp.org/index.php/Session_Management_Cheat_Sheet, Jan. 8, 2016.
Extended European Search Report dated Dec. 19, 2018.
U.S. Office Action for corresponding U.S. Appl. No. 16/125,930 dated Feb. 21, 2020.
Japanese Office Action for Japanese Application No. 2018-505916 dated Dec. 3, 2019.
U.S. Office Action for corresponding U.S. Appl. No. 16/125,930 dated Dec. 1, 2020.
U.S. Appl. No. 16/125,930, filed Sep. 10, 2018.
U.S. Appl. No. 16/138,144, filed Sep. 21, 2018.
U.S. Appl. No. 16/142,403, filed Sep. 26, 2018.
Final Office Action for corresponding U.S. Appl. No. 16/142,403 dated Dec. 15, 2020.
U.S. Office Action for corresponding U.S. Appl. No. 16/125,930 dated Jul. 23, 2020.
U.S. Office Action for corresponding U.S. Appl. No. 16/142,403 dated Jul. 28, 2020.
U.S. Office Action for corresponding U.S. Appl. No. 16/138,144 dated Jul. 30, 2020.
European Patent Office Communication pursuant to Article 94(3) EPC dated Nov. 18, 2020 for European Patent Application No. 17 774 772.2.
Analysis of Netflix's security framework for 'Watch Instantly' service, Pomelo, LLC Tech Memo, Mar.-Apr. 2009.
U.S. Notice of Allowance for corresponding U.S. Appl. No. 16/125,930 dated Feb. 4, 2021.
U.S. Office Action for corresponding U.S. Appl. No. 16/138,144 dated Feb. 5, 2021.
U.S. Notice of Allowance for corresponding U.S. Appl. No. 16/142,403 dated Mar. 24, 2021.
U.S. Notice of Allowance for corresponding U.S. Appl. No. 16/138,144 dated May 14, 2021.

* cited by examiner

| TERMINAL ID | COMMUNICATION STATE | IP ADDRESS |
|---|---|---|
| asai@myhost.ricoo.com/theta1 | ONLINE | 1.2.1.3 |
| asai@myhost.ricoo.com/pc | ONLINE | 1.2.1.4 |
| asai@myhost.ricoo.com/car | ONLINE | 1.2.1.5 |
| ... | ... | ... |
| jim@myhost.obrom.com/theta2 | OFFLINE (1) | 1.2.2.3 |
| jim@myhost.obrom.com/camera3 | OFFLINE (2) | 1.2.3.3 |
| ... | ... | ... |

FIG.10

| AUTHENTICATION SYSTEM ID | URL OF AUTHENTICATION SYSTEM |
|---|---|
| a01 | http://··· |
| a02 | http://··· |
| a03 | http://··· |
| ... | ... |

FIG.11

| TERMINAL ID OF COMMUNICATION SOURCE | TERMINAL IDS OF COMMUNICATION DESTINATIONS WITH WHICH COMMUNICATION IS POSSIBLE |
|---|---|
| asai@myhost.ricoo.com/theta1 | asai@myhost.ricoo.com/pc, asai@myhost.ricoo.com/car |
| asai@myhost.ricoo.com/pc | asai@myhost.ricoo.com/theta1, asai@myhost.ricoo.com/car |
| asai@myhost.ricoo.com/car | asai@myhost.ricoo.com/theta1, asai@myhost.ricoo.com/pc |
| ... | ... |

FIG.12A

| USER ID (TO-BE-AUTHENTICATED SECTION) | PASSWORD |
|---|---|
| asai@myhost.ricoo.com | aaaa |
| jim@myhost.obrom.com | abab |
| ... | ... |

FIG.12B

| USER ID (TO-BE-AUTHENTICATED SECTION) | PASSWORD |
|---|---|
| asai | baba |
| kurt | bbbb |
| ... | ... |

FIG.12C

| USER ID (TO-BE-AUTHENTICATED SECTION) | PASSWORD |
|---|---|
| kondo | caca |
| kulbaski | cccc |
| ... | ... |

# SERVICE PROVIDING SYSTEM, SERVICE DELIVERY SYSTEM, SERVICE PROVIDING METHOD, AND NON-TRANSITORY RECORDING MEDIUM

CROSS-REFERENCE TO RELATED APPLICATIONS

The present patent application is a continuation of international application No. PCT/JP2017/012103, filed Mar. 24, 2017, which is based on and claims priority to Japanese patent application No. 2016-066335 filed Mar. 29, 2016. The contents of these applications are incorporated herein by reference in their entirety.

FIELD OF THE INVENTION

The present invention relates to a service providing system, a service delivery system, a service providing method, and a non-transitory recording medium.

BACKGROUND ART

A system with which, in a case where a service is provided to a user through the Internet, the service is actually provided to the user after terminal identification information (a terminal ID or the like) is determined as authorized information through a process where the user is authenticated with the use of the terminal identification information or a password sent from the user's communication terminal is widely used (see Patent document 1).

SUMMARY

According to one aspect of the present invention, a service providing system for providing a service to a communication terminal includes a processor configured to associate with one another a plurality of pieces of terminal identification information for identifying different communication terminals and to manage the plurality of pieces of terminal identification information, each of the plurality of pieces of terminal identification information including user identification information that is a to-be-authenticated section to be used to authenticate a user and is common to the plurality of pieces of terminal identification information, the processor being further configured to manage and associate the plurality of pieces of terminal identification information with one another as a piece of terminal identification information for a communication source and a piece of terminal management information for a communication destination that can perform communication with the communication source; to receive from a first communication terminal as a communication source a first piece of terminal identification information for identifying the first communication terminal and a second piece of terminal identification information for identifying a second communication terminal as a communication destination; and, in response to receiving the first piece of terminal identification information and the second piece of terminal identification information, to transmit a request to the second communication terminal to start communication with the first communication terminal for a case where the first piece of terminal identification information and the second piece of terminal identification information are managed and associated with one another and not to transmit a request to the second communication terminal to start communication with the first communication terminal for a case where the first piece of terminal identification information and the second piece of terminal identification information are not managed as being associated with one another.

BRIEF DESCRIPTION OF THE DRAWINGS

FIG. 10 is a conceptual diagram illustrating one example of an authentication system management table.

FIG. 11 is a conceptual diagram illustrating one example of a communication object management table.

FIG. 12A is a conceptual diagram illustrating one example of an authentication management table of the authentication system 7a.

FIG. 12B is a conceptual diagram illustrating one example of an authentication management table of the authentication system 7b.

FIG. 12C is a conceptual diagram illustrating one example of an authentication management table of the authentication system 7c.

DESCRIPTION OF EMBODIMENTS

In the above-described system, if communication terminals of differing users were able to perform communication with one another, one user would, for example, perform remote control of a communication terminal of another user. Such a situation may cause disadvantageousness to the another user. In order to prevent communication terminals of differing users from performing communication with one another, security settings should be performed on communication of the respective communication terminals, which may be difficult to implement through a simple procedure.

According to an embodiment of the present invention, a service providing system can prevent, by an easy method, communication terminals of differing users from performing communication with one another.

Now, with the use of the drawings, the embodiment will be described.

<<Overall Configuration of Embodiment>>

Figure 1:
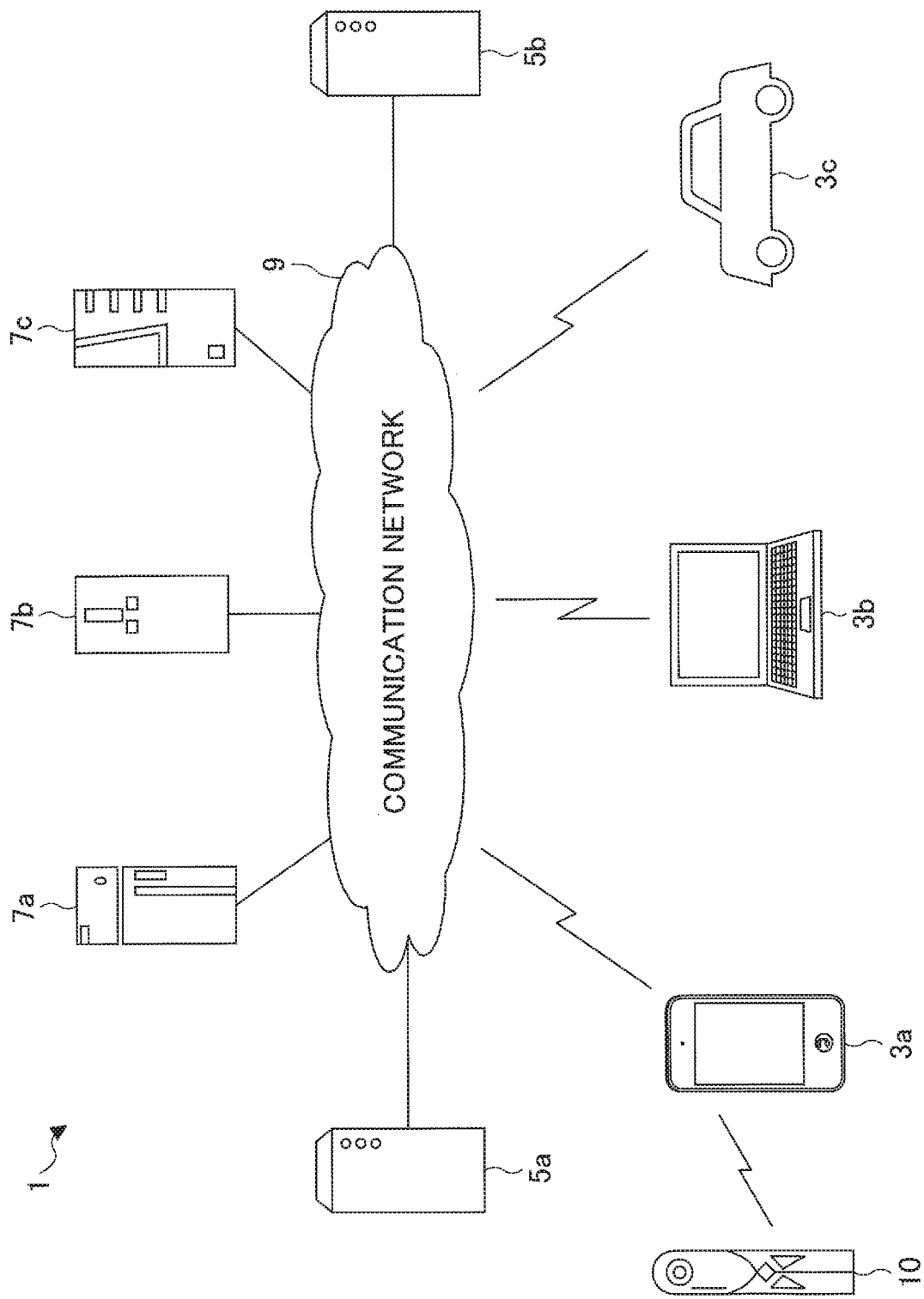
FIG. 1 is an overall configuration diagram illustrating one example of a service delivery system according to an embodiment.

FIG. 1 is an overall configuration diagram illustrating one example of a service delivery system according to the embodiment. As illustrated in FIG. 1, the service delivery system 1 includes a plurality of communication terminals (3a, 3b, and 3c), a plurality of service providing systems (5a and 5b), a plurality of authentication systems (7a, 7b, and 7c), and a photographing apparatus 10. These elements can perform communication with each other via a communication network 9 such as the Internet.

The photographing apparatus 10 is, for example, a digital camera that captures an image of a scene, for example, to generate a full spherical panoramic image. The communication terminal 3a is, for example, a smartphone. The communication terminal 3a performs communication with the photographing apparatus 10 with the use of short-range wireless communication technology such as Bluetooth (registered trademark). For example, as a result of the communication terminal 3a transmitting to the photographing apparatus 10 an instruction to start a photographing operation, the photographing apparatus 10 transmits to the communication terminal 3a various data obtained from a photographing operation such as image data and sound data. The photographing apparatus 10 cannot use the communication network 9 by itself, and therefore, transmits through the communication terminal 3a various data to the communication network 9. The communication terminal 3b is, for example, a personal computer. The communication terminal 3c is, for example, a car navigation apparatus.

Note that, in FIG. 1, for the sake of simplifying the explanation, the three communication terminals (3a, 3b, and 3c), the two service providing systems (5a and 5b), the three authentication systems (7a, 7b, and 7c), and the single photographing apparatus 10 are illustrated. However, the numbers of the elements are not limited to these numbers of the elements. Further, hereinafter, out of the communication terminals (3a, 3b, and 3c), any one of the communication terminals will be referred to as a "communication terminal 3". Out of the service providing systems (5a and 5b), either one of the service providing systems will be referred to as a "service providing system 5". Further, out of the authentication systems (7a, 7b, and 7c), any one of the authentication systems will be referred to as an "authentication system 7".

Further, the service providing systems 5 and the authentication systems 7 may be single computers, or each of the service providing systems 5 and the authentication systems 7 may include a plurality of computers. The photographing apparatus 10 may be also a common digital camera that does not have a function to generate a full spherical panorama image.

Further, a communication terminal 3 may be a smartphone, a personal computer, or a car navigation apparatus, as an example of a mobile terminal. Further, examples of the communication terminals 3 are not limited to these devices. For example, a communication terminal 3 may be an information processing terminal, a business machine, a home appliance, an electric component, a medical device, an industrial device, or the like. Examples of the mobile terminal include, in addition to the above-mentioned devices, a smart watch, a head mount display, a video conference terminal, a camera, a handheld terminal, and a drone. Examples of the information processing terminal include a desktop PC, a tablet PC, and a server. Examples of the business machine include a copier, a facsimile machine, a MFP (Multifunction Peripheral) that has functions of a copier and a facsimile machine, an electronic blackboard, a video conference terminal, and a projector. Examples of the home appliance include a television, an air conditioner, a refrigerator, a recorder, and a microwave oven. Examples of the electric component include an electronic component such as an image pickup device. Examples of the medical device include a MRI (Magnetic Resonance Imaging) device, an EEG (Electroencephalography) device, a MEG (Magnetoencephalography) device, and an endoscope. Examples of the industrial device include a construction machine and a working robot.

<How to Use Photographing Apparatus>

With the use of FIGS. 2A-2C and FIG. 3, how to use the photographing apparatus 10 will now be described.

Figure 2A:
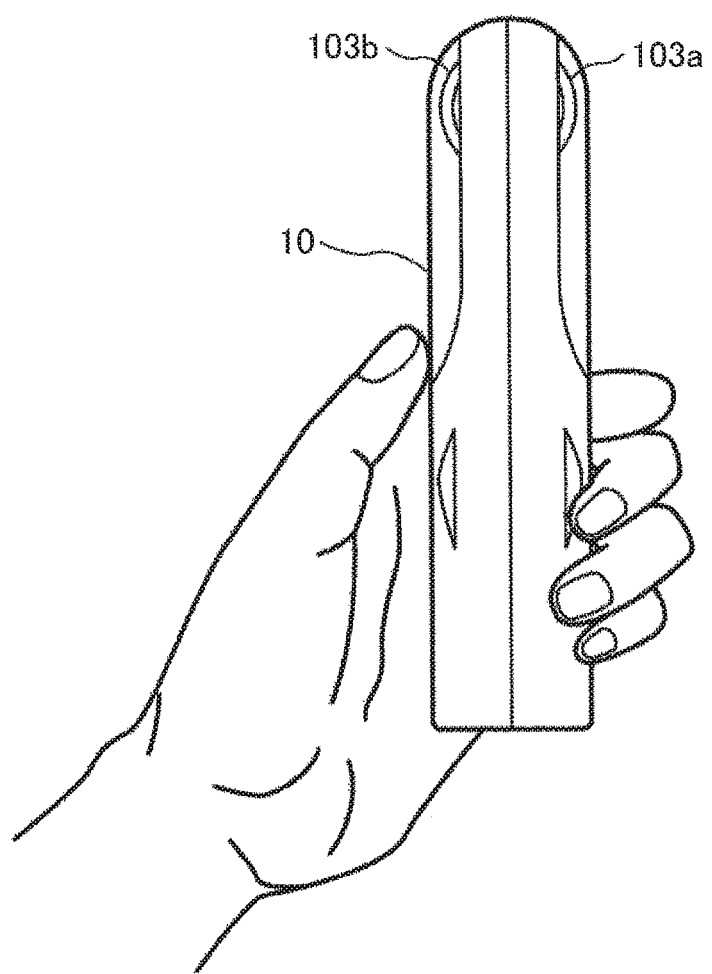
FIG. 2A is a left side view of one example of a photographing apparatus.
Figure 2B:
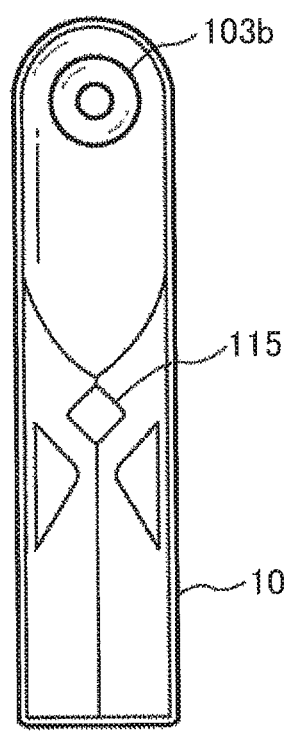
FIG. 2B is a front view of the example of the photographing apparatus.
Figure 2C:
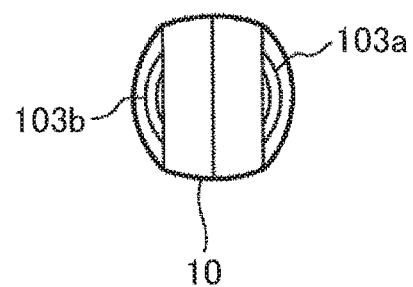
FIG. 2C is a plan view of the example of the photographing apparatus.

With the use of FIGS. 2A-2C, the exterior of the photographing apparatus 10 will now be described. FIG. 2A is a left side view of one example of the photographing apparatus, FIG. 2B is a front view of the example of the photographing apparatus, and FIG. 2C is a plan view of the example of the photographing apparatus. The photographing apparatus 10 is a digital camera for obtaining a photographed image from which a full spherical (360°) panoramic image is generated.

As illustrated in FIG. 2A, the photographing apparatus 10 has such a size that a person can hold with his or her single hand. Further, as illustrated in FIGS. 2A-2C, at an upper section of the photographing apparatus 10, an image pickup device 103a at a front side and an image pickup device 103b at a back side (rear side) are installed. Further, as illustrated in FIG. 2B, at a front side of the photographing apparatus 10, an operation part 115 such as a shutter button is installed.

Figure 3:
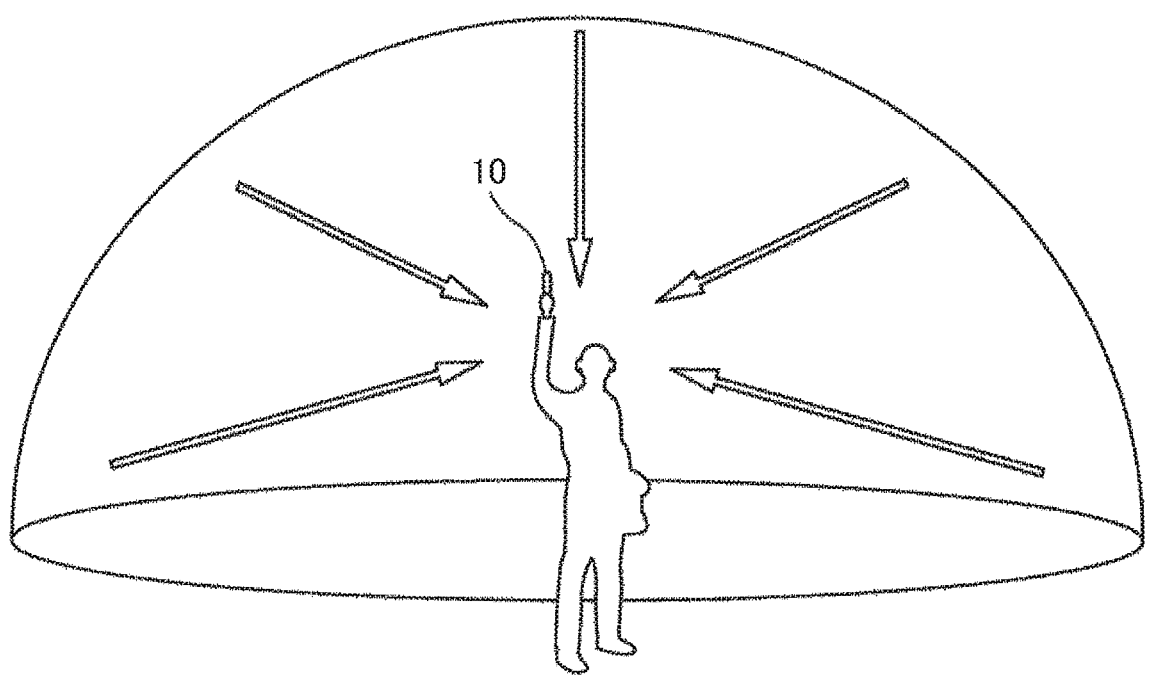
FIG. 3 is an image diagram illustrating one example of a usage state of the photographing apparatus.

Next, with the use of FIG. 3, a usage state of the photographing apparatus 10 will be described. FIG. 3 is an image diagram illustrating one example of a usage state of the photographing apparatus. As illustrated in FIG. 3, the photographing apparatus 10 is used in such a manner that a user holds the photographing apparatus 10 with his or her hand and takes an image of an object or a scene around the user. In this case, as a result of the image pickup device 103a and the image pickup device 103b illustrated in FIGS.

2A-2C capturing images of an object or a scene around the user, two hemispherical images can be obtained.

<<Hardware Configuration of Embodiment>>

Next, with the use of FIGS. 4-6, the hardware configurations of the photographing apparatus 10, the communication terminals 3, and the service providing systems 5 according to the embodiment will be described in detail.

<Hardware Configuration of Photographing Apparatus>

With the use of FIG. 4, the hardware configuration of the photographing apparatus 10 will now be described. Note that, FIG. 4 is a hardware configuration diagram of one example of the photographing apparatus 10. Below, it is assumed that the photographing apparatus 10 is an omnidirectional photographing apparatus using the two image pickup devices. However, the number of the image pickup devices may be three or more. Further, the photographing apparatus 10 is not necessarily dedicated for omnidirectional photographing. That is, the photographing apparatus 10 may have substantially the same function as an omnidirectional photographing apparatus as a result of a retrofit-type omnidirectional photographing unit being installed to a common digital camera, smartphone or the like.

Figure 4:
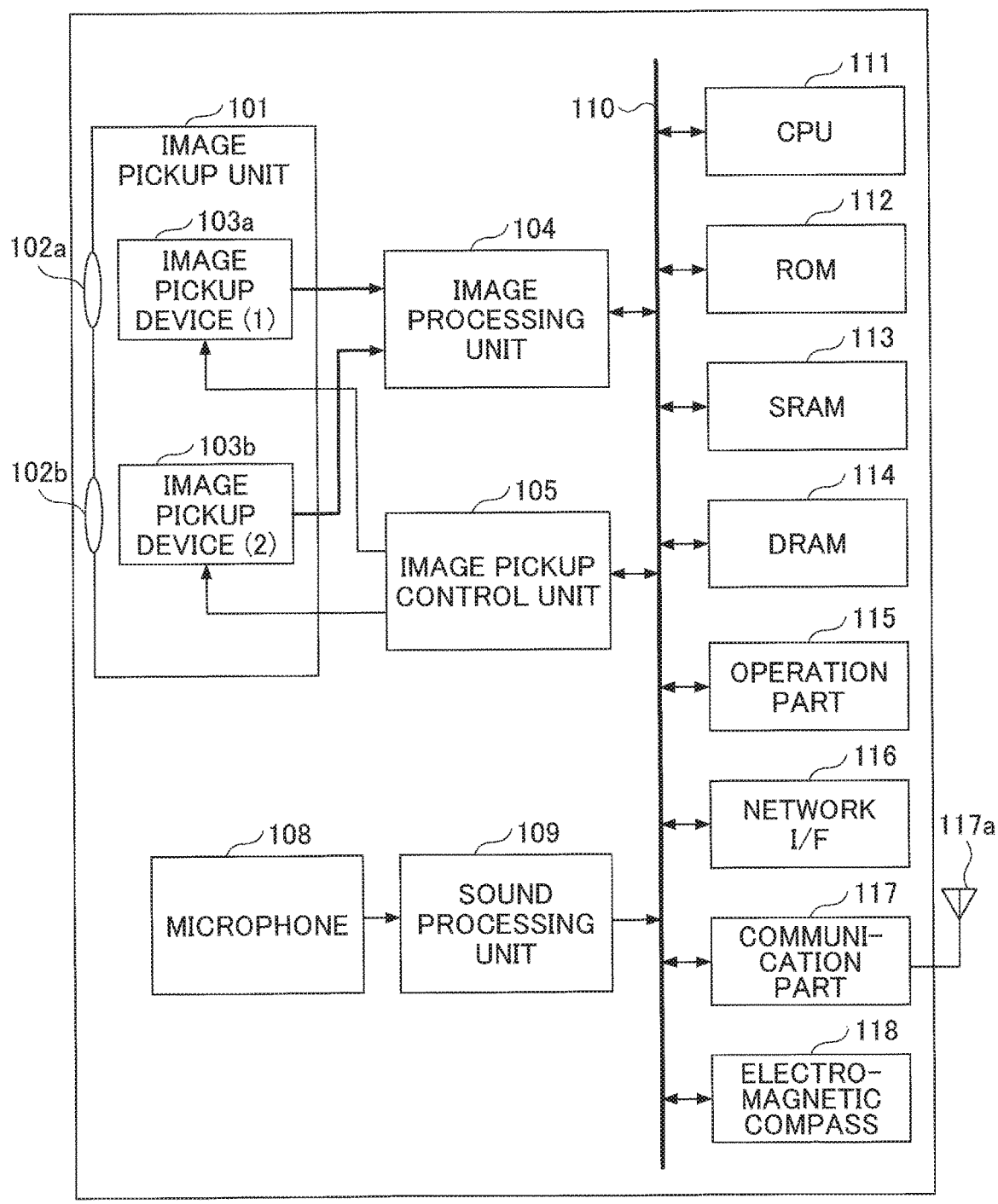
FIG. 4 is a hardware configuration diagram of one example of the photographing apparatus 10.

As illustrated in FIG. 4, the photographing apparatus 10 includes an image pickup unit 101, an image processing unit 104, an image pickup control unit 105, a microphone 108, a sound processing unit 109, a CPU (Central Processing Unit) 111, a ROM (Read-Only Memory) 112, a SRAM (Static Random Access Memory) 113, a DRAM (Dynamic Random Access Memory) 114, the operation part 115, a network I/F 116, a communication part 117, and an antenna 117a.

The image pickup unit 101 includes wide-angle lenses (so-called fish-eye lenses) 102a and 102b, each of which has a field angle greater than or equal to 180° for forming a hemispherical image; and the two image pickup devices 103a and 103b corresponding to the wide-angle lenses 102a and 102b, respectively. The image pickup devices 103a and 103b include image sensors such as CMOS (Complementary Metal Oxide Semiconductor) sensors or CCD (Charge Coupled Device) sensors converting optical images obtained through the fish-eye lenses into electric image data signals; timing circuits generating horizontal or vertical synchronization signals, pixel clocks, and so forth; and a group of registers in which various commands and parameters required for operating the image pickup devices are set.

The respective image pickup devices 103a and 103b of the image pickup unit 101 are connected with the image processing unit 104 through a parallel I/F bus. The image pickup devices 103a and 103b of the image pickup unit 101 are connected also with the image pickup control unit 105 through a serial I/F bus (an I2C bus or the like). The image processing unit 104 and the image pickup control unit 105 are connected with the CPU 111 through a bus 110. Further, to the bus 110, also the ROM 112, the SRAM 113, the DRAM 114, the operation part 115, the network I/F 116, the communication part 117, an electromagnetic compass 118, and so forth are connected.

The image processing unit 104 performs a predetermined process on image data output from the image pickup devices 103a and 103b through the parallel I/F bus, and combines the processed image data to generate Mercator image data.

Generally speaking, the image pickup control unit 105 acts as a master device, the image pickup devices 103a and 103b act as slave devices, and the image pickup control unit 105 sets commands and so forth to the group of registers of the image pickup devices 103a and 103b through the I2C bus. The commands and so forth are received from the CPU 111. Further, the image pickup control unit 105 uses also the I2C bus to receive status data and so forth of the group of registers of the image pickup devices 103a and 103b, and sends the status data and so forth to the CPU 111.

Further, in response to the shutter button of the operation part 115 being pressed, the image pickup control unit 105 sends an instruction to the image pickup devices 103a and 103b to output image data. Depending on the photographing apparatus, a preview display function or a function to display a moving picture by using a display may be implemented. In this case, the image pickup devices 103a and 103b output image data continuously at a predetermined frame rate (frames/second).

Further, as will be described later, the image pickup control unit 105 also functions as a synchronization control part in cooperation with the CPU 111 to synchronize output timing of image data from the image pickup devices 103a and 103b. Note that, according to the embodiment, the photographing apparatus 10 does not have a display part. However, the photographing apparatus 10 may have a display part.

The microphone 108 converts sound into sound (signal) data. The sound processing unit 109 receives sound data from the microphone 108 through an I/F bus, and performs a predetermined process on the sound data.

The CPU 111 performs overall control of the photographing apparatus 10 and performs required processes. The ROM 112 stores various programs for the CPU 111. The SRAM 113 and the DRAM 114 are work memories, and store a program executed by the CPU 111, data that is being processed by the CPU 111, and so forth. Especially, the DRAM 114 stores image data that is being processed by the image processing unit 104 and Mercator image data that has been processed.

As the operation part 115, various operation buttons, a power switch, a shutter button, a touch panel having both a display function and an operation function, and so forth are generally referred to. The user operates the operation buttons to input various photographing modes, photographing conditions, and so forth.

As the network I/F 116, interfaces (USB I/F and so forth) for external media such as a SD card, a personal computer, and so forth are generally referred to. The network I/F 116 may be a network interface usable for both wired communication and wireless communication. Mercator image data stored in the DRAM 114 is recorded in an external medium through the network I/F 116 or is transmitted to an external apparatus such as a communication terminal 3 through the network I/F 116 as the occasion demands.

The communication part 117 performs communication with an external apparatus such as a communication terminal 3 through the antenna 117a installed at the photographing apparatus 10 according to short-range wireless communication technology such as WiFi (wireless fidelity), NFC, or the like. It is possible to transmit Mercator image data also through the communication part 117 to an external apparatus such as a communication terminal 3.

The electromagnetic compass 118 uses terrestrial magnetism to calculate the orientation of the photographing apparatus 10 and outputs orientation information. The orientation information is one example of related information (metadata) according to Exif, and is used for image processing such as image correction on a photographed image. Note that the related information includes various data such as date and time when an image is photographed and the data size of image data.

<Hardware Configuration of Smartphone>

Figure 5:
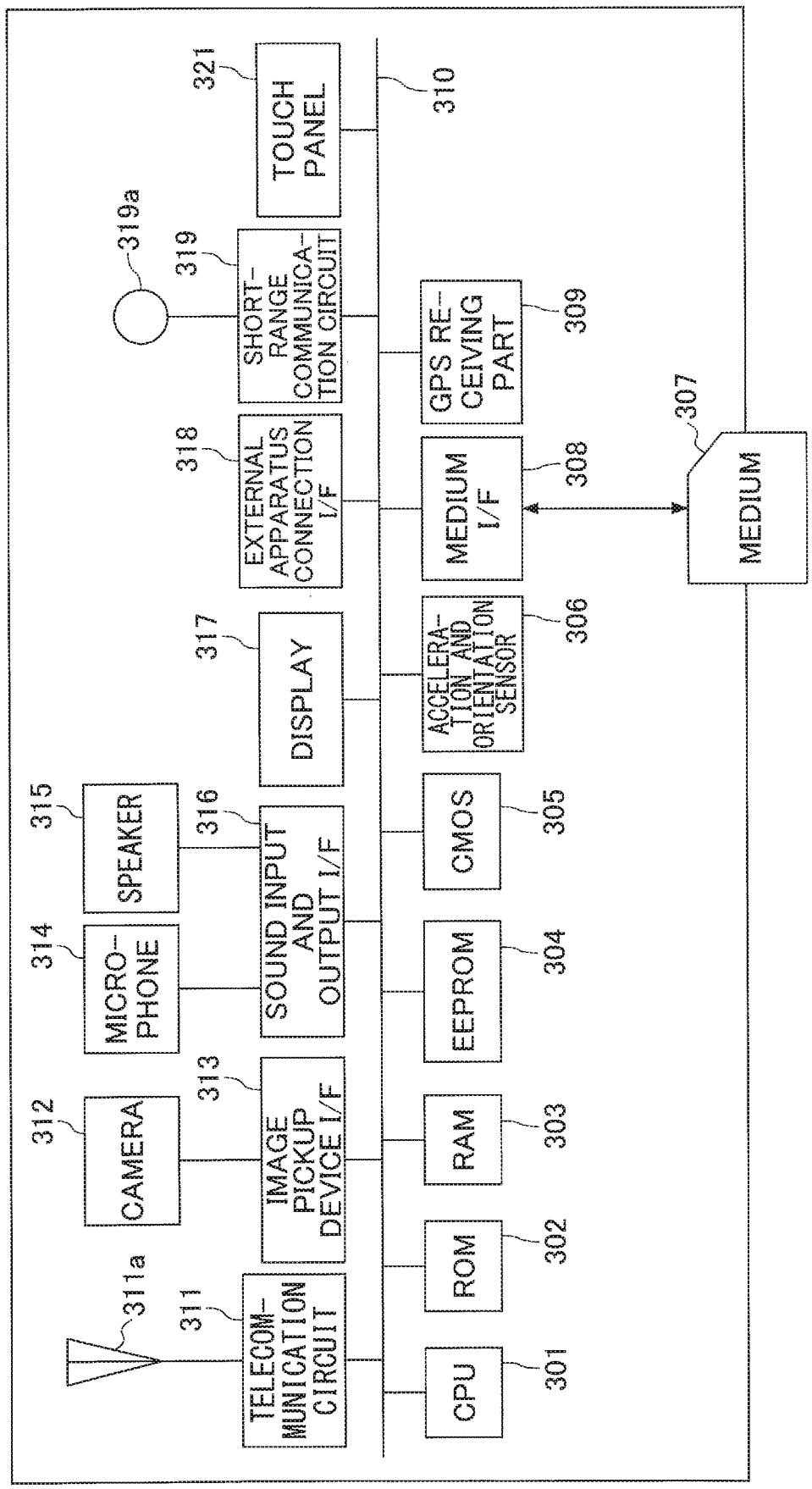
FIG. 5 is a hardware configuration diagram illustrating one example of communication terminals 3a, 3b, and 3c.

FIG. 5 is a hardware configuration diagram illustrating one example of a smartphone. As illustrated in FIG. 5, a communication terminal 3a as the smartphone includes a CPU 301, a ROM 302, a RAM 303, an EEPROM 304, a CMOS sensor 305, an acceleration and orientation sensor 306, a medium I/F 308, and a GPS receiving part 309.

The CPU 301 controls the entirety of the smartphone. The ROM 302 stores a program such as an IPL for driving the CPU 301. The RAM 303 is used as a work area for the CPU 301. The EEPROM 304 reads and writes various data such as the program for the smartphone under the control of the CPU 301. The CMOS sensor 305 captures an image of a subject (mainly, an image of the user himself or herself) to obtain image data under the control of the CPU 301. The acceleration and orientation sensor 306 includes various sensors such as an electromagnetic compass to detect geomagnetism, a gyrocompass, and an acceleration sensor. The medium I/F 308 controls reading data from and writing (storing) data to a recording medium 307 such as a flash memory. The GPS receiving part 309 receives GPS signals from GPSs.

Further, the smartphone includes a telecommunication circuit 311, a camera 312, an image pickup device I/F 313, a microphone 314, a speaker 315, a sound input and output I/F 316, a display 317, an external apparatus connection I/F 318, a short-range communication circuit 319, an antenna 319a for the short-range communication circuit 319, and a touch panel 321.

The telecommunication circuit 311 performs communication with another apparatus through the communication network 9. The camera 312 is a type of a built-in-type image pickup part for capturing an image of a subject to obtain image data under the control of the CPU 301. The image pickup device I/F 313 controls driving of the camera 312. The microphone 314 is a type of a built-in-type sound collecting part for inputting sound. The sound input and output I/F 316 performs processes to input a sound signal from the microphone 314 and to output a sound signal to the speaker 315 under the control of the CPU 301. The display 317 is a type of a liquid crystal or organic EL display part to display an image of a subject, various icons, and so forth. The external apparatus connection I/F 318 is an interface to connect to various external apparatuses. The short-range communication circuit 319 is a communication circuit that uses NFC, Bluetooth (registered trademark), or the like. The touch panel 321 is a type of an input part for the user to touch the display 317 to operate the smartphone.

Further, the smartphone includes a bus line 310. The bus line 310 includes an address bus, a data bus, and so forth to electrically connect with various elements illustrated in FIG. 5 such as the CPU 301.

<Hardware Configuration of Each of PC, Car Navigation Apparatus, Service Providing Systems, and Authentication Systems>

With the use of FIG. 6, a hardware configuration of each of the PC, the car navigation apparatus, the service providing systems, and the authentication systems will now be described. Note that FIG. 6 is a hardware configuration diagram of each of examples of the PC, the car navigation apparatus, the service providing systems, and the authentication systems. Each of the PC, the car navigation apparatus, the service providing systems, and the authentication systems is a computer. Therefore, below, a configuration of a service providing system 5 will be described and descriptions of configurations of the other apparatuses and systems will be omitted.

Figure 6:
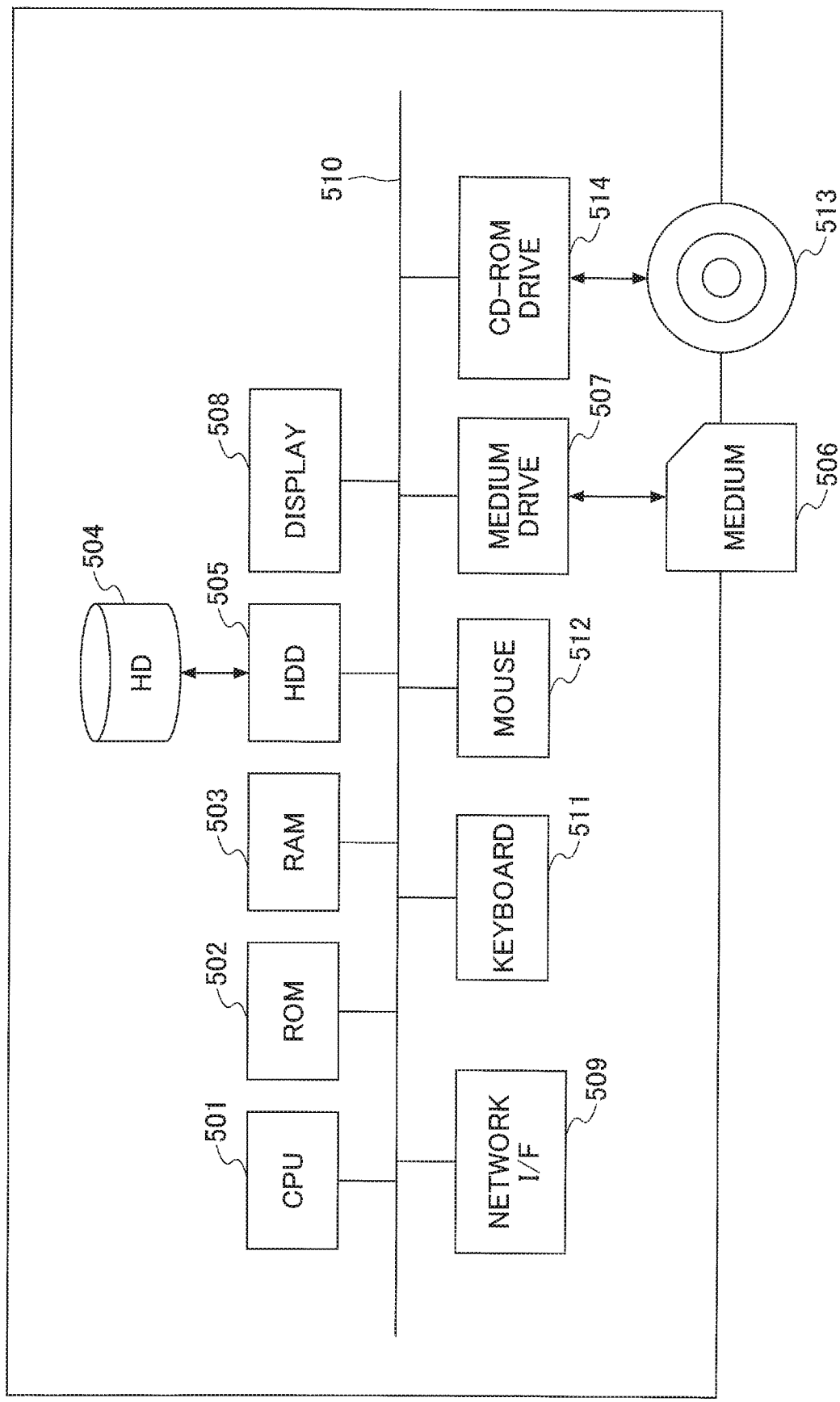
FIG. 6 is a hardware configuration diagram of one example of each of service providing systems 5a and 5b and authentication systems 7a, 7b, and 7c.

A service providing system 5 includes a CPU 501 to control the entirety of the service providing system 5, a ROM 502 to store a program such as an IPL to drive the CPU 501, a RAM 503 used as a work area of the CPU 501, a HD 504 to store various data such as the program for the service providing system 5, a HDD (Hard Disk Drive) 505 to control reading various data from and writing various data to the HD 504 under the control of the CPU 501, a medium I/F 507 to control reading data from and writing (storing) data to a recording medium 506 such as a flash memory, a display 508 to display various information such as a cursor, a menu, a window, characters, and an image, a network I/F 509 to perform data communication through the communication network 9, a keyboard 511 having a plurality of keys for the user to input characters, numerical values, various instructions, and so forth, a mouse for the user to select and cause various instructions to be executed, to select an object to process, to move the cursor, and so forth, a CD-ROM drive 514 to control reading various data from and writing various data to a CD-ROM (Compact Disc Read-Only Memory) 513 as a type of a detachable recording medium, and a bus line 510 such as an address bus, a data bus, and so forth to electrically connect the above-mentioned various elements as illustrated in FIG. 6.

Note that recording media such as CD-ROMs to store the various programs according to the embodiment may be provided domestically or internationally in the form of program products.

<<Functions of Embodiment>>

Figure 7:
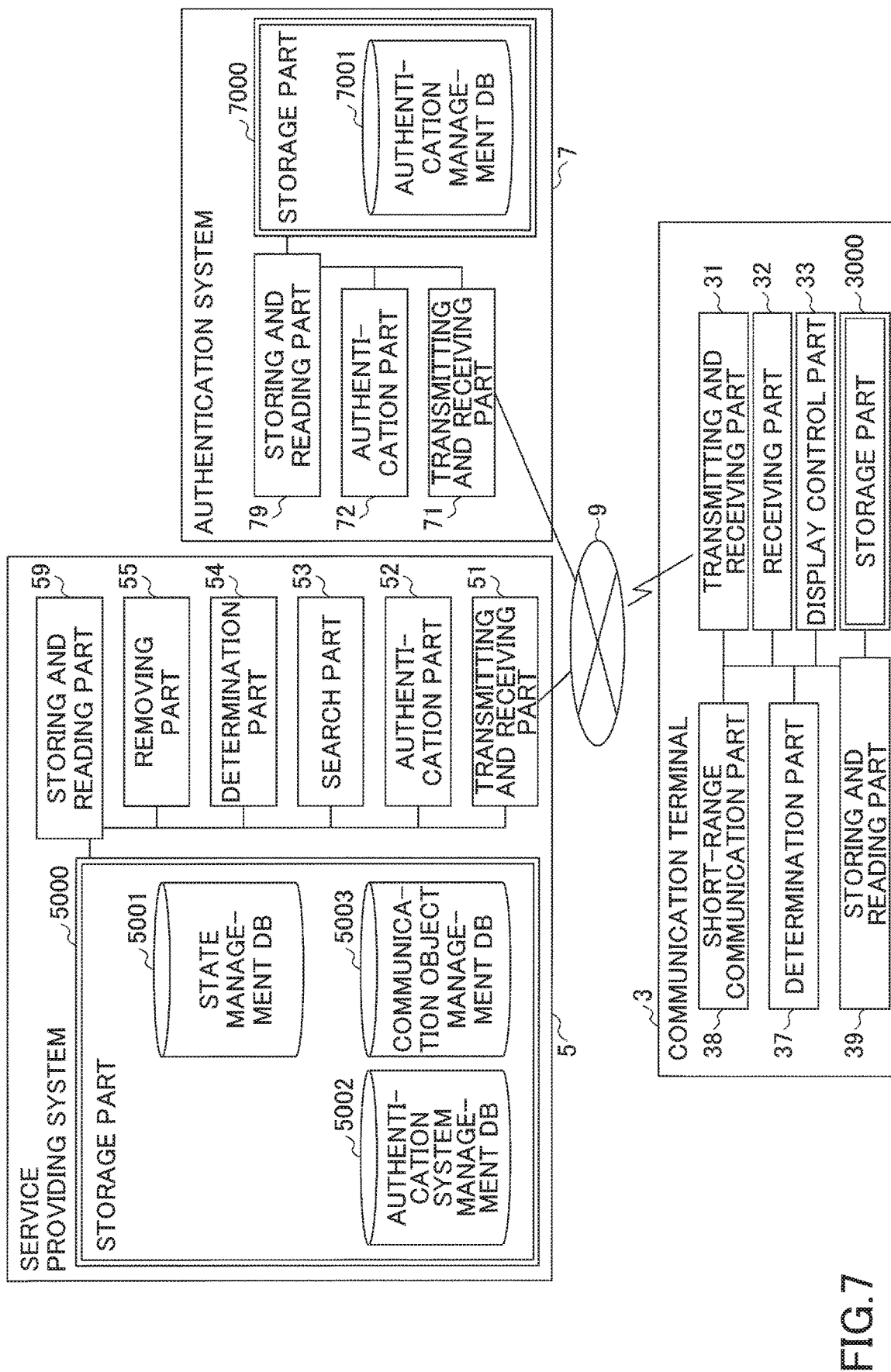
FIG. 7 is a functional block diagram of one example of the service delivery system.

Next, functions of the embodiment will be described. FIG. 7 is a functional block diagram illustrating one example of the service delivery system. Note that each of the functions that will now be described may be implemented by one or more processing circuits. A "processing circuit" includes one or more devices out of a processor programmed by software to execute the function such as a processor implemented by an electronic circuit; an ASIC (Application Specific Integrated Circuit), a DSP (digital signal processor), or a FPGA (field programmable gate array) designed to execute the function; a conventional circuit module; and so forth.

<Functions of Communication Terminals>

Hereinafter, with the use of the communication terminal 3a for which the hardware configuration is illustrated in FIG. 5, the functions of the communication terminals 3 will be described. In this regard, either one of the communication terminals 3b and 3c also has functions similar to or the same as the functions of the communication terminal 3a.

As illustrated in FIG. 7, the communication terminal 3 includes a transmitting and receiving part 31, a receiving part 32, a display control part 33, a determination part 37, a short-range communication part 38, and a storing and reading part 39. Functions of these elements are implemented as a result of any element(s) illustrated in FIG. 5 operating according to instructions from the CPU 301 according to the program for the communication terminal 3 written in the RAM 303 from the EEPROM 304.

Further, the communication terminal 3 includes a storage part 3000 implemented by the ROM 302, the RAM 303, and the EEPROM 304 illustrated in FIG. 5.

(Various Functions of Communication Terminals)

Next, with the use of FIG. 7, the various functions of the communication terminal 3 will be described in more detail.

The transmitting and receiving part 31 of the communication terminal 3 is implemented mainly by instructions from the CPU 301 illustrated in FIG. 5 and by the telecommunication circuit 311. Through the communication network 9, the transmitting and receiving part 31 performs transmitting/receiving of various data (or information) such as IDs (Identifications) and requests, to/from a service providing system 5 and an authentication system 7.

The receiving part 32 is implemented mainly by instructions from the CPU 301 illustrated in FIG. 5 and by the touch panel 321, to receive an operation performed by the user.

The display control part 33 is implemented mainly by instructions from the CPU 301 illustrated in FIG. 5, to display a predetermined screen page on the display 317. Note that, in the case of the communication terminal 3a, the display control part 33 may use OpenGL ES (Open Graphics Library for Embedded Systems) to paste Mercator image data transmitted from the photographing apparatus 10 to cover a sphere to create a full spherical panoramic image.

The determination part 37 is implemented mainly by instructions from the CPU 301 illustrated in FIG. 5, and, as will be described later, determines, out of a code of a terminal ID, a user ID (a to-be-authenticated section) that will be described later. Note that a terminal ID according to the embodiment is one example of terminal identification information. Terminal identification information may be, instead of a terminal ID, the product number of a terminal or the like. A user ID according to the embodiment is one example of user identification information. User identification information may be, instead of a user ID, the name of a user, an individual number or "my number" according to the Japanese national citizen identification number system, or the like.

The short-range communication part 38 is implemented mainly by instructions from the CPU 301 illustrated in FIG. 5 and by the short-range communication circuit 319, to perform communication with the photographing apparatus 10 and so forth by using the short-range communication circuit 319.

The storing and reading part 39 is implemented mainly by instructions from the CPU 301 illustrated in FIG. 5, to store various data (or information) in the storage part 3000 and to read various data (or information) from the storage part 3000.

<Functions of Service Providing Systems>

Next, with the use of FIGS. 6-11, functions of the service providing systems 5 will be described in detail. As illustrated in FIG. 7, a service providing system 5 includes a transmitting and receiving part 51, an authentication part 52, a search part 53, a determination part 54, a removing part 55, and a storing and reading part 59. The respective functions of the elements are implemented as a result of any element(s) illustrated in FIG. 6 operating according to instructions from the CPU 501 according to the program for the service providing system 5 written from the HD 504 to the RAM 503.

Further, a service providing system 5 includes a storage part 5000 implemented by the RAM 503 and the HD 504 illustrated in FIG. 6. The storage part 5000 stores various data sent from a communication terminal 3 and an authentication system 7.

Further, the storage part 5000 includes a state management DB 5001, an authentication system management DB 5002, and a communication object management DB 5003. The state management DB 5001 has a form of a state management table that will be described later. The authentication system management DB 5002 has a form of an authentication system management table that will be described later. The communication object management DB 5003 has a form of a communication object management table that will be described later. These tables will now be described in detail.

(State Management Table)

Figures 8, 9A:
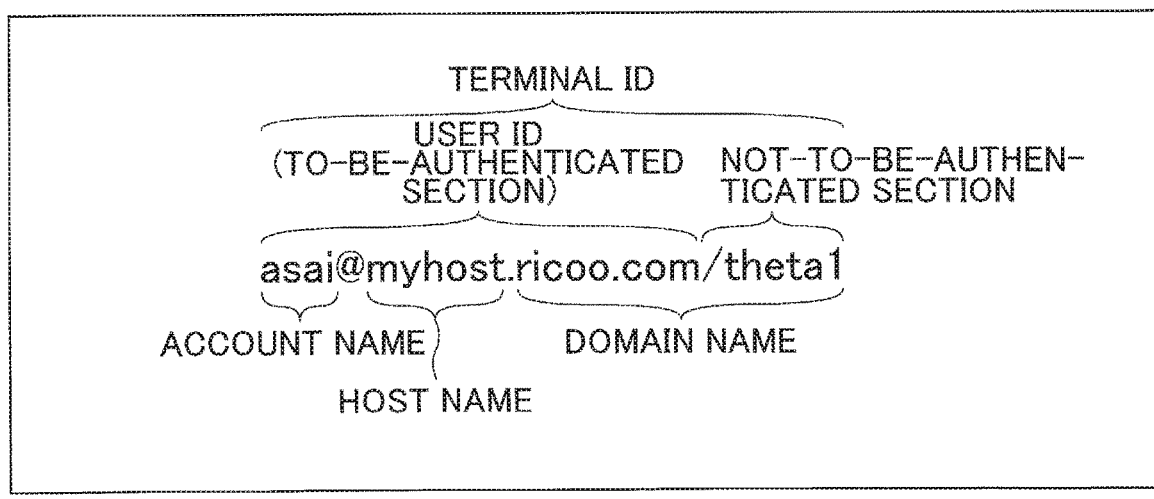
FIG. 8 is a conceptual diagram illustrating one example of a state management table.
FIG. 9A illustrates one example of a configuration pattern of a terminal ID (1/3).

FIG. 8 is a conceptual diagram illustrating one example of the state management table. The state management table associates terminal IDs for identifying communication terminals, communication state information indicating the communication states of the communication terminals, and the IP addresses of the communication terminals with each other and manages these items of information. A communication state is one of an online state and an offline state. Further, to an offline state, an order of becoming online is attached. For example, in FIG. 8, the communication state "offline (1)" can first become an online state. The communication state "offline (2)" can subsequently become an online state. "The order of becoming online" will be further described later. Note that, the IP addresses in FIG. 8 illustrate addresses according to IPv4 in a simplified manner. Instead, the IP addresses may be addresses according to IPv6.

A service providing system 5 adds, in response to receiving a login request from a communication terminal 3, a new record including the terminal ID of the communication terminal that is the request source to the state management table and removes, in response to receiving a logout request from a communication terminal 3, the record including the terminal ID of the communication terminal that is the request source from the state management table. Adding a record and removing a record described above will be further described later.

Figure 9B:
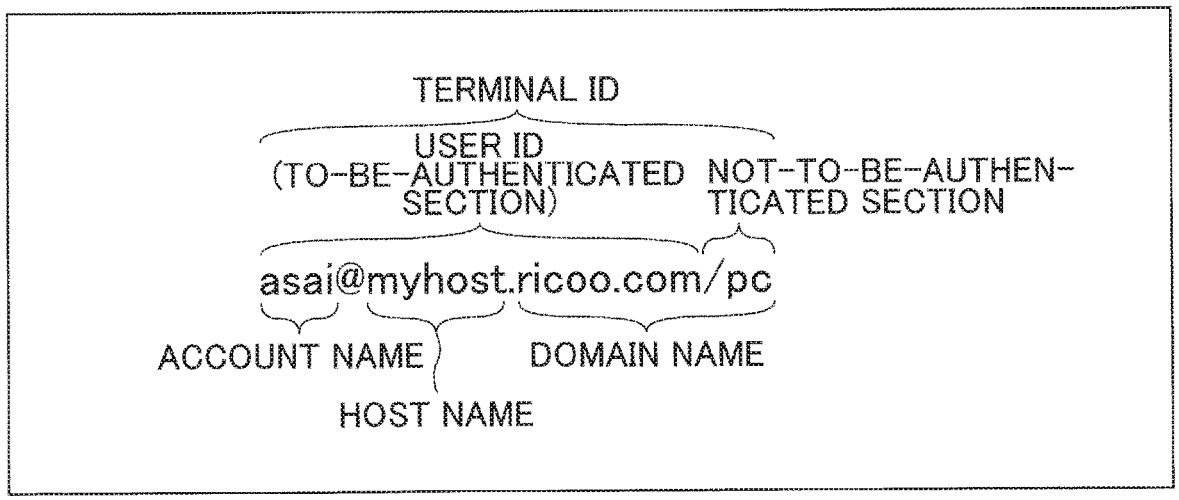
FIG. 9B illustrates one example of a configuration pattern of a terminal ID (2/3).
Figure 9C:
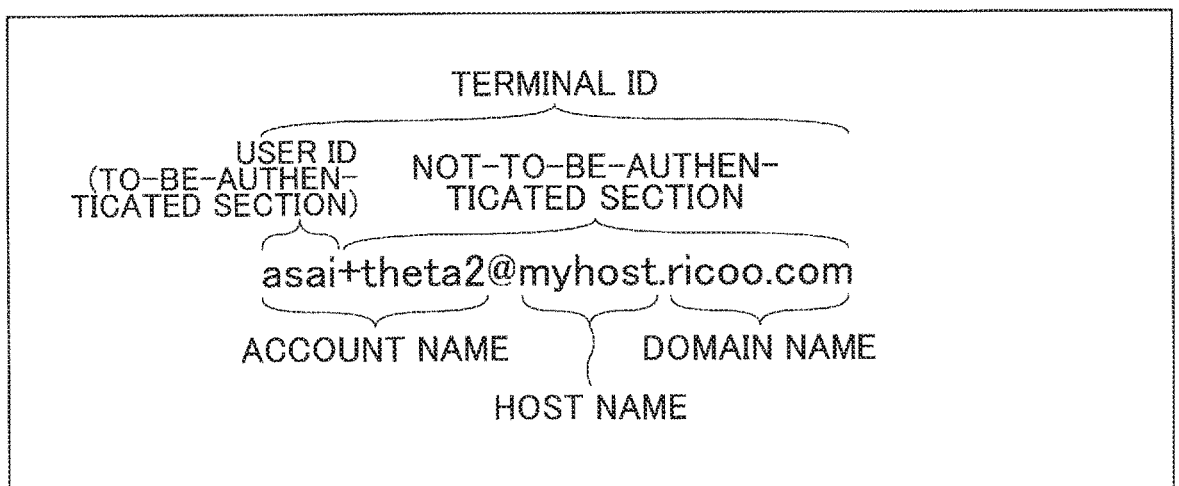
FIG. 9C illustrates one example of a configuration pattern of a terminal ID (3/3).

FIGS. 9A-9C illustrate email addresses as examples of the terminal IDs (identifications); each of the email addresses includes a to-be-authenticated section and a not-to-be-authenticated section. The to-be-authenticated section is a user ID to be used by an authentication system 7 to perform authentication. The not-to-be-authenticated section is not used by an authentication system 7 to perform authentication.

According to a first pattern illustrated in FIG. 9A, a to-be-authenticated section include an account name "asai", a host name "myhost", and a first segment "ricoo.com" of a domain name. A not-to-be-authenticated section includes a second segment "theta1" of the domain name. In this case, the extracting part 37 described later separates between the to-be-authenticated section and the not-to-be-authenticated section by using a symbol "/".

Further, also FIG. 9B illustrates the first pattern; however, a not-to-be-authenticated section is different from FIG. 9A. In this regard, an authentication system 7 determines that the terminal ID illustrated in FIG. 9A and the terminal ID illustrated in FIG. 9B have the same IDs to perform authentication because these terminal IDs have the same to-be-authenticated sections.

Note that the terminal ID may be a terminal ID of a second pattern illustrated in FIG. 9C. According to the second pattern, the to-be-authenticated section includes a first segment "asai" of an account name. The not-to-be-authenticated section includes a second segment "theta2" of the account name, a host name "myhost", and a domain name "ricoo.com". In this case, the extracting part 37 described later separates between the to-be-authenticated section and the not-to-be-authenticated section by using a symbol "+".

(Authentication System Management Table)

FIG. 10 is a conceptual diagram illustrating one example of the authentication system management table. The authentication system management table associates, with the authentication system IDs for identifying respective authentication systems 7, the URLs (Uniform Resource Locators) to access the authentication systems 7, and stores and manages these items of information.

(Communication Object Management Table)

FIG. 11 is a conceptual diagram illustrating one example of the communication object management table. The communication object management table associates the terminal IDs of communication terminals of communication sources that request to start communication, with the terminal IDs of communication terminals of communication destinations that can perform communication with the communication terminals of the communication sources, and manages these items of information. The terminal IDs associated with one another and managed for each record in the communication object management table are used to manage communication terminals which can perform communication with one another, and therefore, communication terminals identified by terminal IDs not associated with one another in a record of the communication object management table cannot perform communication with one another. According to the embodiment, terminal IDs having the same user IDs are associated with one another. Therefore, communication terminals of the same user can perform communication with one another while communication terminals of differing users cannot perform communication with one another.

(Various Functions of Service Providing Systems)

Next, with the use of FIG. 7, the various functions of the service providing systems 5 will be described in detail.

The transmitting and receiving part 51 of a service providing system 5 transmits/receives various data (or information) such as IDs and requests, to/from a communication terminal 3 and an authentication system 7 through the communication network 9.

The authentication part 52 decrypts an encrypted token and authenticates a decrypted token, for example.

The search part 53 searches the state management table to determine, out of pieces of communication state information associated with the terminal IDs of other communication terminals 3 including the user IDs the same as the user ID included in the terminal ID of a communication terminal 3, the number of pieces of communication state information having online states, for example.

The determination part 54 determines whether the number of pieces of communication state information having online states thus retrieved by the search part 53 is less than a predetermined number, for example. The predetermined number is, for example, 10. In this case, the same user can cause 10 own communication terminals to perform communication with each other.

The removing part 55 removes, in response to receiving a logout request from a communication terminal 3, the record including the terminal ID for identifying the communication terminal 3 from the state management table, for example. Further, the removing part 55 removes, in response to receiving a logout request from a communication terminal 3, the record that is used to manage the terminal ID of the communication terminal 3 as a communication terminal of a communication source from the communication object management table, for example. Removing a record described above will be further described later.

The storing and reading part 59 stores various data in and reads various data from the storage part 5000.

<Functions of Authentication Systems>

Next, with the use of FIGS. 7 and 12A-12C, functions of the authentication systems 7 will be described in detail. An authentication system 7 includes a transmitting and receiving part 71, an authentication part 72, and a storing and reading part 79. Functions of these elements are implemented as a result of any element(s) illustrated in FIG. 7 operating according to instructions from the CPU 501 according to the program for the authentication system 7 written from the HD 504 to the RAM 503.

Further, an authentication system 7 includes a storage part 7000 implemented by the RAM 503 and the HD 504 illustrated in FIG. 6. The storage part 7000 stores various data sent from a communication terminal 3 and a service providing system 5.

Further, the storage part 7000 includes an authentication management DB 7001. The authentication management DB 7001 has a form of an authentication management table that will be described now. Below, the table will be described in detail.

(Authentication Management Table)

FIG. 12A is a conceptual diagram illustrating one example of the authentication management table of the authentication system 7a. FIG. 12B is a conceptual diagram illustrating one example of the authentication management table of the authentication system 7b. FIG. 12C is a conceptual diagram illustrating one example of the authentication management table of the authentication system 7c.

Each of the authentication management tables associates the user IDs (the to-be-authenticated sections) out of the terminal IDs with passwords, and stores and manages these items of information.

(Various Functions of Authentication Systems)

Next, with the use of FIG. 7, the various functions of the authentication systems 7 will be described in detail.

The transmitting and receiving part 71 of an authentication system 7 is implemented mainly by instructions from the CPU 501 illustrated in FIG. 6 and by the network I/F 509, to transmit/receive various data (or information) such as IDs and requests, to/from a communication terminal 3 and a service providing system 5 through the communication network 9.

The authentication part 72 is implemented mainly by instructions from the CPU 501 illustrated in FIG. 6, to determine whether a communication terminal 3 that has transmitted an authentication request is an authorized communication terminal 3 that can receive a service, to authenticate the ID.

The storing and reading part 79 is implemented mainly by instructions from the CPU 501 illustrated in FIG. 6 and by the HDD 505, to store various data (or information) in the storage part 7000 and to read various data (or information) from the storage part 7000.

<<Process and Operation of Embodiment>>

Figure 13:
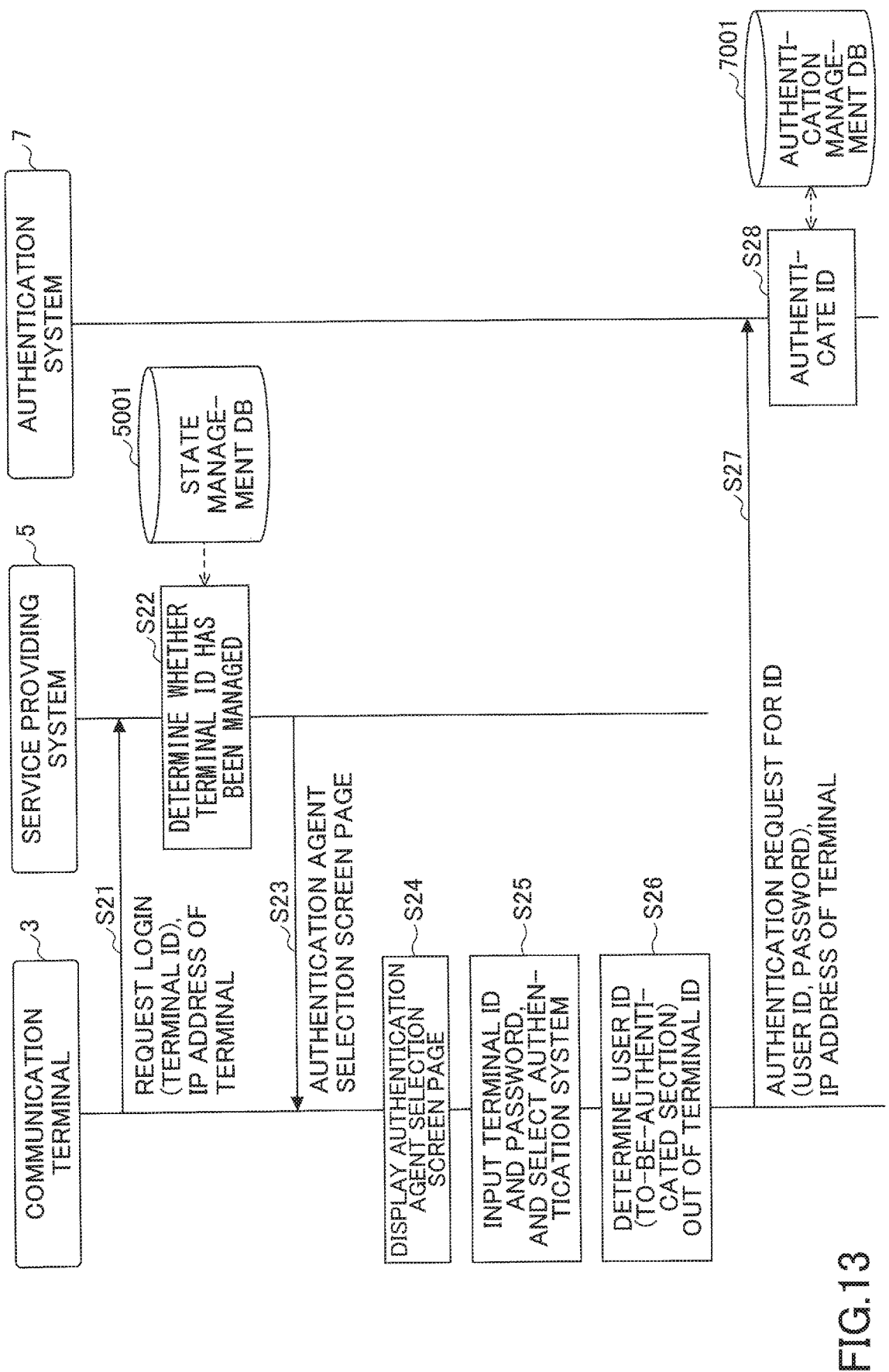
FIG. 13 is a sequence diagram illustrating one example of an authentication process (1/2).
Figure 14:
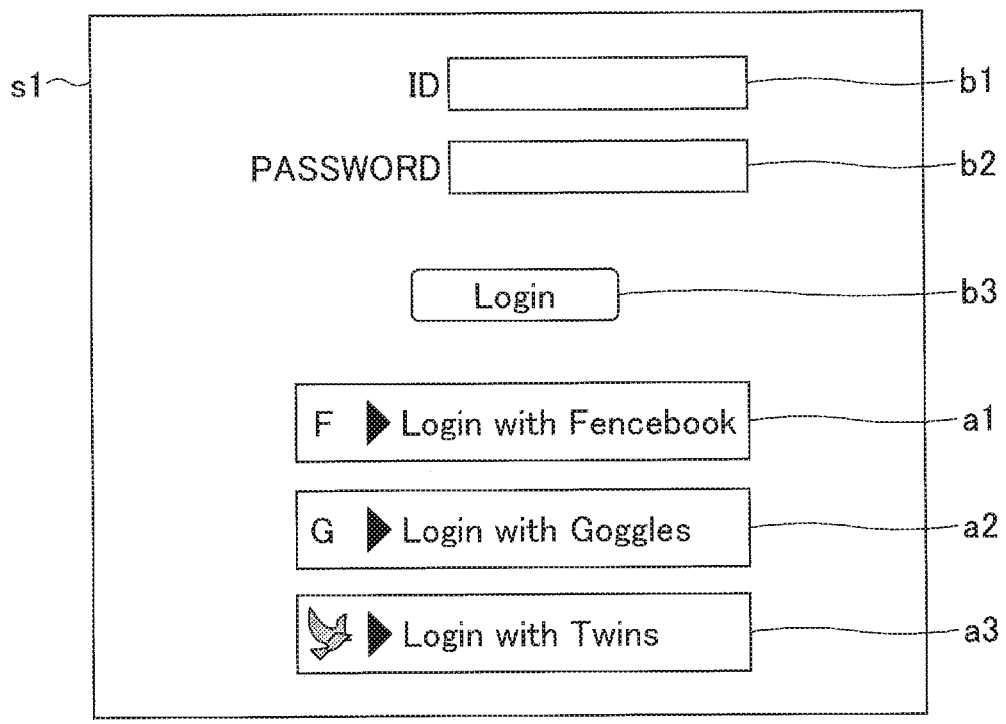
FIG. 14 illustrates one example of a displayed authentication agent selection screen page.
Figure 15:
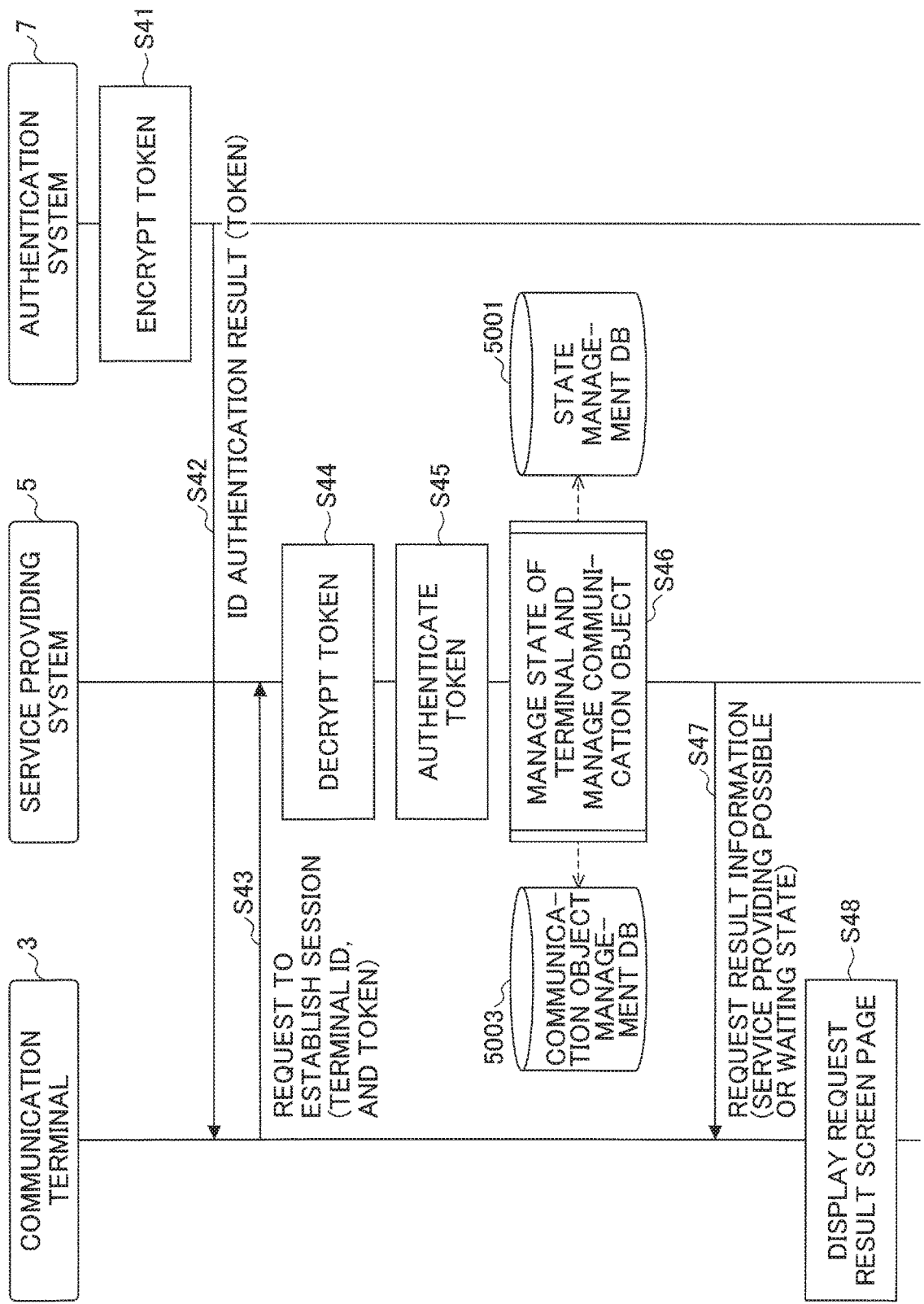
FIG. 15 is a sequence diagram illustrating one example of an authentication process (2/2).

Next, with the use of FIGS. 13-22B, a process and an operation of the embodiment will be described in detail. FIGS. 13 and 15 are sequence diagrams illustrating one example of an authentication process. FIG. 14 illustrates an example of a displayed authentication agent selection screen page.

As illustrated in FIG. 13, the transmitting and receiving part 31 of a communication terminal 3 transmits a login request to a service providing system 5 (step S21). This request includes the terminal ID of the communication terminal 3. Further, at this time, the transmitting and receiving part 31 transmits the IP address of the communication terminal 3. Thus, the transmitting and receiving part 51 of the service providing system 5 receives the login request and the IP address of the communication terminal 3.

Next, the determination part 54 of the service providing system 5 determines whether the terminal ID received in step S21 has been managed in the state management table (step S22). Below, a case where the terminal ID has not been managed will be described.

The transmitting and receiving part 51 of the service providing system 5 transmits to the communication terminal 3 data of an authentication agent selection screen page (step S23). Thus, the transmitting and receiving part 31 of the communication terminal 3 receives the data of the authentication agent selection screen page.

Next, the display control part 33 of the communication terminal 3 displays on the display 317 the authentication agent selection screen page s1 such as the screen page illustrated in FIG. 14 (step S24). FIG. 14 illustrates an example of the screen page displayed on the PC as the communication terminal 3b. The authentication agent selection screen page s1 includes a terminal ID input field b1, a password input field b2, and a login button b3 to request login (to make an authentication request). Further, the authentication agent selection screen page s1 includes authentication system selection buttons a1, a2, and a3 to select the authentication systems 7a, 7b, and 7c, respectively. In response to the user's inputting the own terminal ID to the input field b1, inputting the own password in the input field b2, pressing a desired button out of the authentication system selection buttons a1, a2, and a3, and pressing the login button b3, the receiving part 32 receives the corresponding inputs and selection (step S25).

Note that, the authentication system selection buttons a1, a2, and a3 are previously associated with the URLs of the authentication systems 7, respectively.

Next, the determination part 37 determines, out of the code of the terminal ID received by the receiving part 32, the user ID (to-be-authenticated section) (step S26). At this time, the determination part 37 determines the user ID on the basis of a predetermined rule (step S26). For example, in a case where the terminal ID has the contents as illustrated in FIG. 9A or FIG. 9B, the section before the symbol "/" after "com" is determined as the user ID.

Next, on the basis of the URL of the authentication system 7 corresponding to the selection button received by the receiving part 32, the transmitting and receiving part 31 transmits an authentication request for the ID (i.e., the user ID) to the corresponding authentication system 7 (step S27). The authentication request includes the user ID received in step S26 and the password received in step S25. Further, at this time, the transmitting and receiving part 31 transmits also the IP address of the communication terminal 3. Thus, the transmitting and receiving part 51 of the service providing system 5 receives the authentication request for the ID and the IP address of the communication terminal 3.

Next, the storing and reading part 79 of the authentication system 7 searches the authentication management table with the set of the user ID (to-be-authenticated section) and the password received in step S27 as a search key for the same set of the to-be-authenticated section and the password. Then, with the use of the search result, the authentication part 72 performs the authentication (step S28). The authentication part 72 determines that, in a case where the same set of the to-be-authenticated section and the password has been managed in the authentication management table, the user of the communication terminal 3 is an authorized user to receive a service from a service providing system 5. However, in a case where the same set of the to-be-authenticated section and the password has not been managed in the authentication management table, the authentication part 72 determines that the communication terminal 3 is not an authorized user to receive a service from a service providing system 5.

Note that, in step S28, the communication terminal 3 determines the user ID (to-be-authenticated section) out of the terminal ID. However, an embodiment is not limited to this configuration. For example, a communication terminal 3 may transmit the terminal ID to a service providing system, and the service providing system 5 may determine the user ID and transmit the user ID to an authentication system 7. Further, a communication terminal 3 may transmit to an authentication system 7 the terminal ID, and the authentication system 7 may determine the user ID and authenticate the user ID.

Next, as illustrated in FIG. 15, the authentication part 72 of the authentication system 7 encrypts a token (a transmission right) (step S41). Then, on the basis of the IP address of the communication terminal 3 received in step S27, the transmitting and receiving part 71 transmits the authentication result for the ID to the communication terminal 3 (step S42). The authentication result indicates whether the communication terminal 3 is authorized and the authentication result includes the token encrypted in step S41. Thus, the transmitting and receiving part 31 of the communication terminal 3 receives the authentication result for the user. Below, a case where the user is authorized will be described.

Note that if the user is not authorized, that is, if the authentication result in step S28 of FIG. 13 is negative, the transmitting and receiving part 71 of the authentication system 7 performs, for example, error output to the communication terminal 3 (i.e., the request source) that transmitted the authentication request for the ID in step S27. Further, in this case, step S41 of encrypting the token is skipped, and, therefore, in step S42, the encrypted token is not transmitted.

The transmitting and receiving part 31 of the communication terminal 3 transmits to the service providing system 5 a request to establish a session (step S43). This request to establish a session includes the terminal ID and the encrypted token received in step 42. Thus, the transmitting and receiving part 51 of the service providing system 5 receives the request to establish a session.

Next, the authentication part 52 of the service providing system 5 decrypts the encrypted token received in step S43 (step S44). Note that the authentication part 52 of the service providing system 5 and the authentication part 72 of the authentication system 7 previously have the same common key (or public key), and therefore, the authentication part 52 can decrypt the token.

Next, on the basis of the decrypted token, the authentication part 52 authenticates the token (step S45). In response to the authentication in step S45 being successful, the service providing system 5 manages the communication state of the communication terminal 3 and a communication object (step S46). In response to the authentication in step S45 being not successful, the transmitting and receiving part 51 performs an error output to the communication terminal 3 that is the request source, for example.

Figure 16:
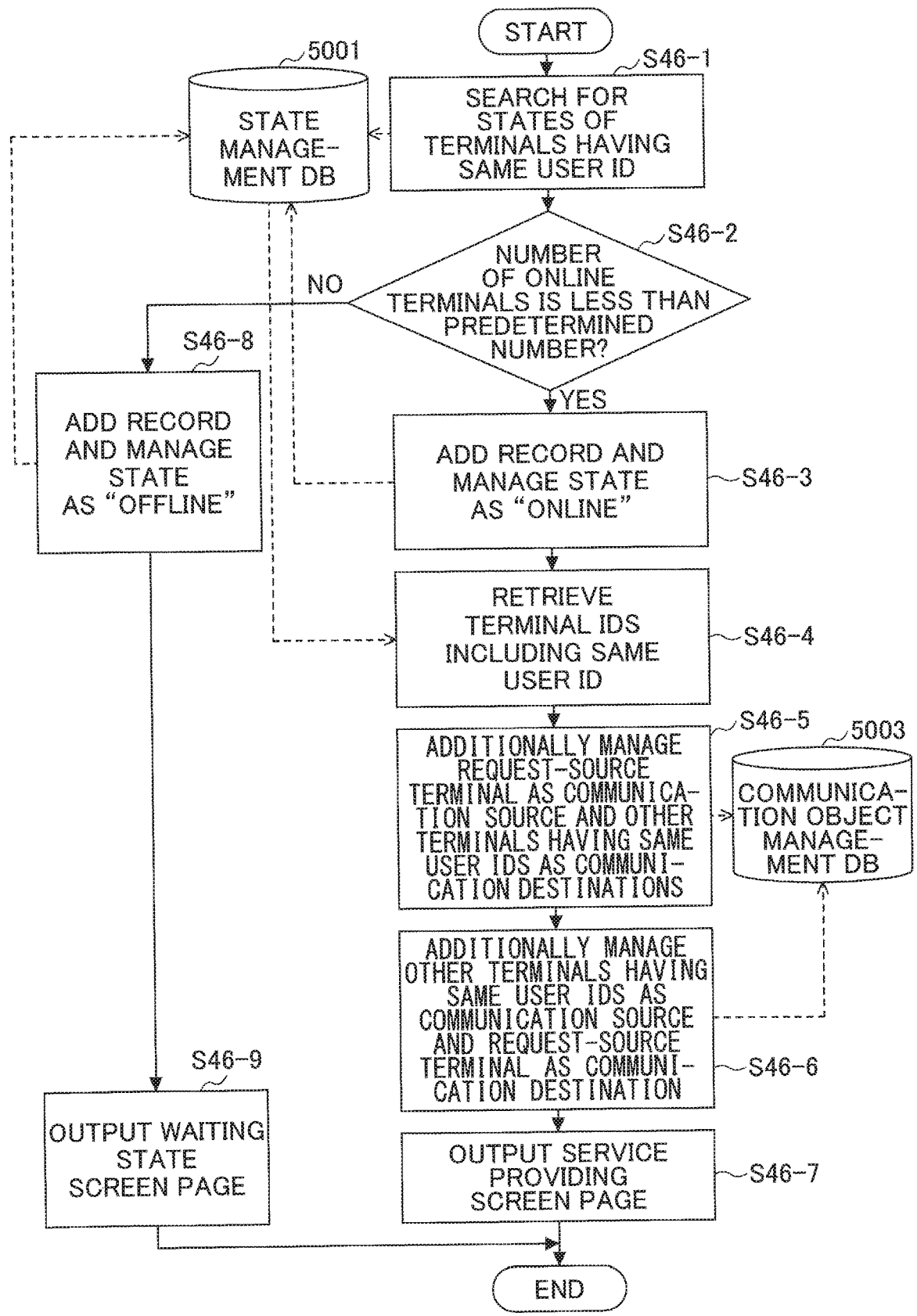
FIG. 16 is a flowchart illustrating one example of managing of a communication state of a communication terminal and a communication object.

Next, with the use of FIG. 16, the managing of the communication state of the communication terminal 3 and a communication object performed by the service providing system 5 will be described. FIG. 16 is a flowchart illustrating one example of managing of the communication state of a communication terminal and a communication object.

As illustrated in FIG. 16, first, the search part 53 searches the state management table of FIG. 8 and counts pieces of communication state information that indicate online states, out of pieces of communication state information associated with the other terminal IDs including the same user ID as the user ID included in the terminal ID of the communication terminal 3 of the request source (step S46-1). Then, the determination part 54 determines whether the thus obtained number of pieces of communication state information is less than a predetermined number (for example, 10) (step S46-2). In a case where the number of pieces of communication state information is less than the predetermined number (YES) as a result of the search by the search part 53, the storing and reading part 59 associates the terminal ID of the communication terminal 3 that is the request source, communication state information that indicates an online state, and the IP address of the same communication terminal 3 with each other and manages these items of information in the state management table (step S46-3). This means that communication to be performed by the communication terminal 3 that is the request source is permitted.

Next, the storing and reading part 59 retrieves from the state management table the other terminal IDs that include the same user IDs as the user ID included in the terminal ID of the communication terminal 3 of the request source and that are terminal IDs having pieces of communication state information that indicate being online (step S46-4). Then, the storing and reading part 59 associates the terminal ID of the communication terminal 3 of the request source as a terminal ID of a "communication source" in a record with the other terminal IDs retrieved in step S46-1 as terminal IDs of "communication destinations" in the record and manages these items of information in the communication object management table (step S46-5). In addition, the storing and reading part 59 associates the terminal ID of the communication terminal of the request source as a terminal ID in "communication destination" fields of the communication object management table with the other terminal IDs retrieved in step S46-1 as terminal IDs in "communication source" fields in the communication object management table and manages these items of information (step S46-6). Then, the storing and reading part 59 outputs from the storage part 5000 data of a service providing screen page that is previously stored (step S46-7).

However, in a case where, in step S46-2, as a result of the search by the search part 53, the number of pieces of communication state information that indicate online states is greater than or equal to the predetermined number (NO), this means that the upper limit of the permissible number of communication terminals of the same user that the same user can use to perform communication among these communication terminals is exceeded and therefore the communication terminal 3 of the request source is not permitted to perform communication. Thus, the storing and reading part 59 associates the terminal ID of the communication terminal 3 of the request source with communication state information that indicates an offline state in the state management table (step S46-8). In this case, at the time of the first of the managed communication state information to indicate an offline state, as illustrated in FIG. 8, the communication state information is managed as "offline (1)", and the next of the managed communication state information to indicate an offline state is managed as "offline (2)". These numerals (1) and (2) indicate the order of waiting for becoming online (as will be described later concerning FIG. 21, in particular, step S84). Then, the storing and reading part 59 outputs data of a waiting state screen page that is previously stored in the storage part 5000 (step S46-9).

Next, returning to FIG. 15, the transmitting and receiving part 51 of the service providing system 5 transmits, to the communication terminal 3 of the request source, request result information that indicates a request result responsive to step S43 (step S47). Thus, the transmitting and receiving part 31 of the communication terminal 3 receives the request result information.

Next, the display control part 33 of the communication terminal 3 of the request source displays on the display 317 of the communication terminal 3 (in this case, the communication terminal 3b) image data included in the request result information (step S48). In this case, in a case where the request result information includes the data of the service providing screen page, the display control part 33 displays the service providing screen page s2 illustrated in FIG. 17A. The service providing screen page s2 indicates that it is possible to receive a service. In this case, for example, the service providing screen page s2 indicates the service contents showing that the user can perform remote control of another communication terminal 3 of the same user.

The data of the service providing screen page s2 further includes an input field b21 for the user to input the terminal ID of another communication terminal that is the remote control object and a "SERVICE START REQUEST" button b22 for the user, after inputting the terminal ID in the input field b21, to request an actual start of the service.

Figure 17A:
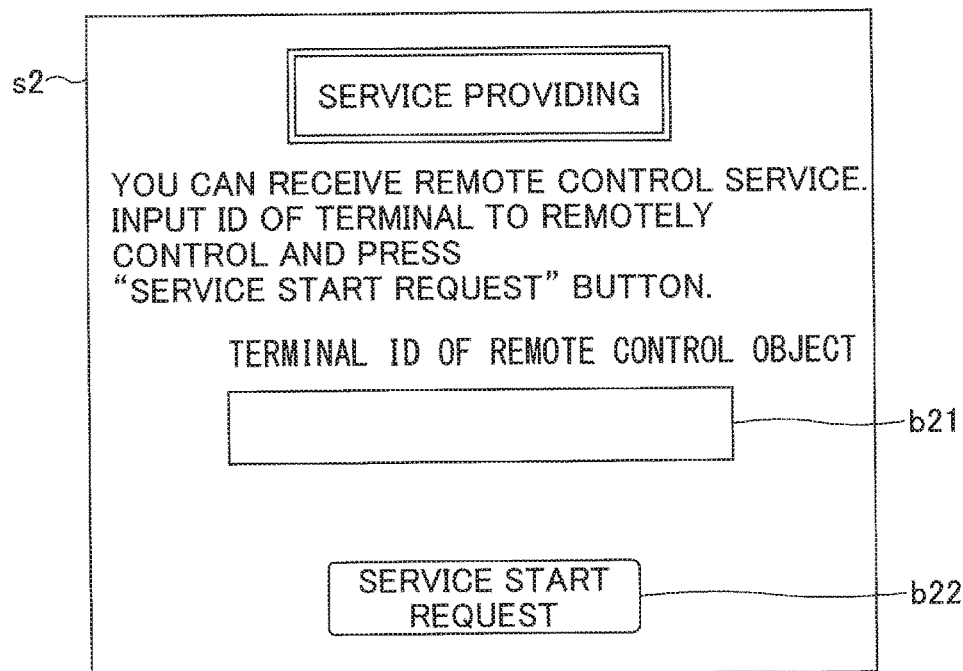
FIG. 17A illustrates one example of a displayed request result screen page (1/2).
Figure 17B:
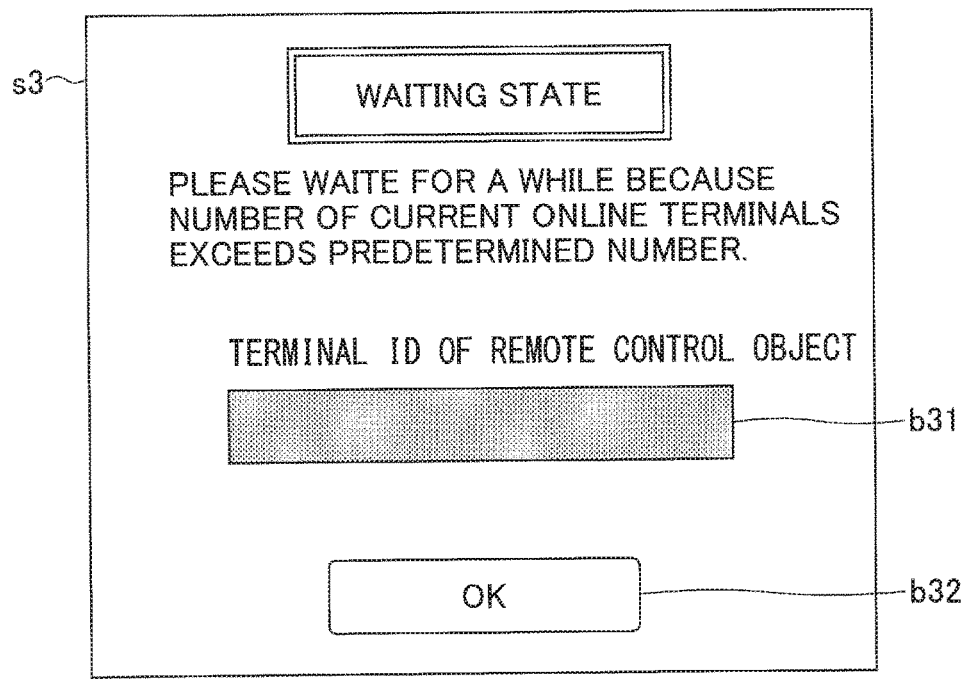
FIG. 17B illustrates one example of a displayed request result screen page (2/2).

In contrast, in a case where the request result information includes the waiting state screen page, the display control part 33 displays the waiting state screen page s3 illustrated in FIG. 17B. The waiting state screen page s3 indicates that the communication terminal 3 of the request source that has requested login cannot receive a service: the user is in a waiting state. In this case, for example, the waiting state screen page s3 indicates that the user cannot perform remote control of another communication terminal 3 of the same user: the user is in a waiting state until being allowed to perform remote control.

Further, the waiting state screen page s3 includes an input field b31 that is masked so as to prevent the user from inputting the terminal ID of another communication terminal that is the remote control object and an "OK" button for the user understanding the contents of the displayed screen page s3 to press to close the waiting state screen page s3.

Note that, in step S22 described above, in a case where the terminal ID received in step S21 has been managed in the state management table, the transmitting and receiving part 51 performs error output to the communication terminal 3 (i.e., the request source) that transmitted the login request, for example.

Figure 18:
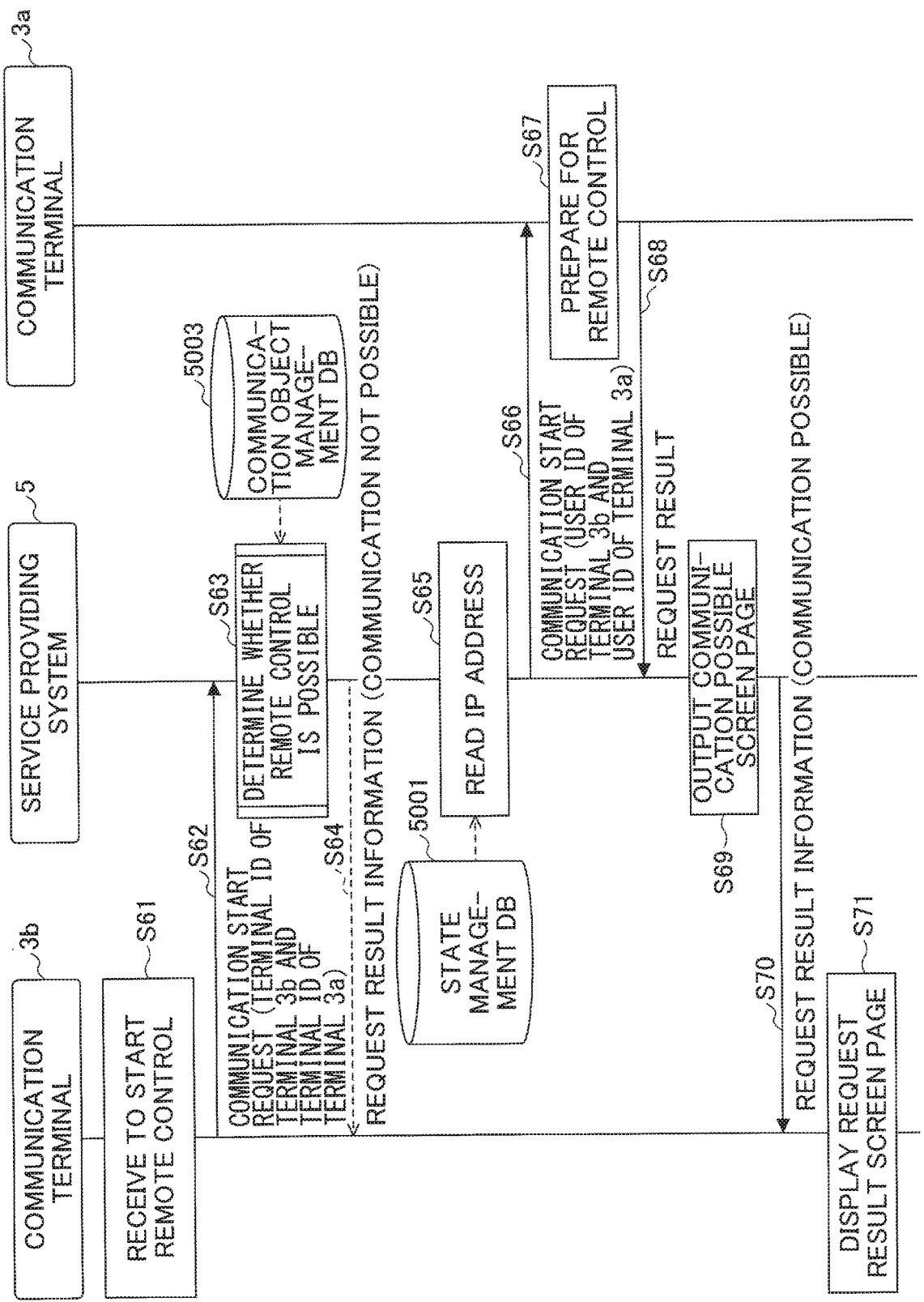
FIG. 18 is a sequence diagram illustrating one example of a process to start remote control.

Next, with the use of FIGS. 18-20B, as an example of providing a service, a remote control service for implementing remote control from the communication terminal 3b to the communication terminal 3a will be described. FIG. 18 is a sequence diagram illustrating one example of a remote control process. Note that, it is assumed that the communication terminals 3a and 3b are communication terminals of the same user. Further, it is also assumed that, in the communication object management table, the terminal IDs of the communication terminals 3a and 3b have been managed as terminal IDs of communication sources, respectively, and also, the respective terminal IDs of the communication terminals 3a and 3b have been managed as terminal IDs of communication destinations with which communication is possible, respectively; and therefore, the communication terminals 3a and 3b are in a state where remote control can be started from the communication terminal 3a to the communication terminal 3b, and also, remote control can be started from the communication terminal 3b to the communication terminal 3a.

In this case, for example, although the user can receive respective services separately with the use of differing terminal IDs (for example, the terminal IDs in the first and second records of the state management table of FIG. 8) concerning the communication terminals 3a and 3b, an authentication system 7 performs the same authentication operations with the use of a set of a common user ID as a to-be-authenticated section (for example, "asai@myhost.ricoo.com" in the authentication management table of FIG. 12A) for the respective terminal IDs of the communication terminals 3a and 3b and a password (in this case, "aaaa"). Therefore, the user need not register terminal IDs and passwords, respectively, for the plurality of authentication operations concerning the communication terminals 3a and 3b.

In the sequence diagram of FIG. 18, in response to the user of the communication terminal 3b inputting in an input field b21 illustrated in FIG. 17A the terminal ID of the communication terminal 3a that is a remote control object and pressing a "SERVICE START REQUEST" button b22, the receiving part 32 of the communication terminal 3b receives the designation of the remote control object and the request to start remote control (step S61). In this example, as one example of remote control, the communication terminal 3b requests the communication terminal 3a to start capturing an image by the photographing apparatus 10. Thus, the transmitting and receiving part 31 of the communication terminal 3b transmits to a service providing system 5 a communication start request (in this example, a request to start remote control) (step S62). The communication start request includes the terminal ID of the communication terminal 3b of the request source (i.e., the remote control source) and the terminal ID of the communication terminal 3a that is the request destination (i.e., the remote control destination). Thus, the transmitting and receiving part 51 of the service providing system 5 receives the communication start request.

Figure 19:
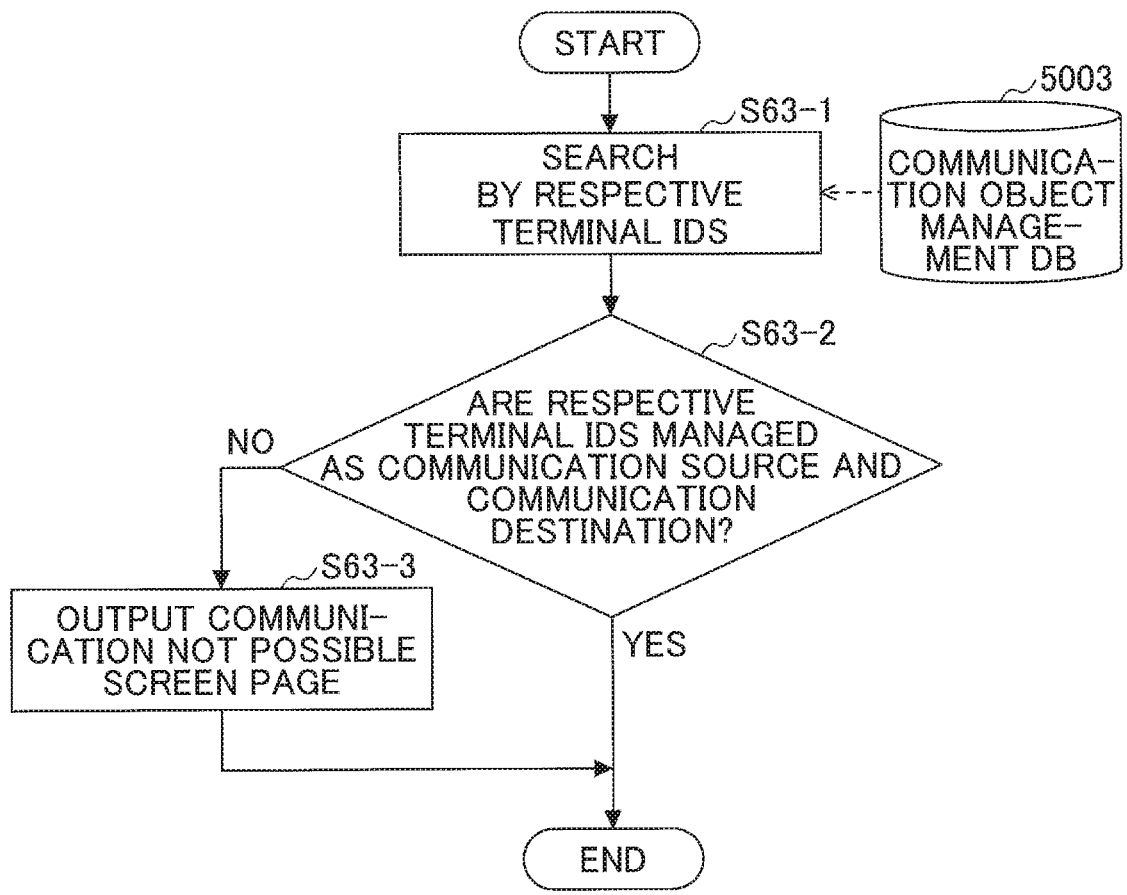
FIG. 19 is a flowchart illustrating one example of a process to determine whether remote control is possible.

Next, the service providing system 5 determines whether remote control is possible (step S63). Below, with the use of FIG. 19, a process of determining whether remote control is possible will be described in detail. FIG. 19 is a flowchart illustrating one example of a process of determining whether remote control is possible.

As illustrated in FIG. 19, the search part 53 searches, in the communication object management table, the fields of terminal IDs of communication sources and the fields of terminal IDs of communication destinations with which communication is possible with the use of the respective terminal IDs of the communication terminal 3b and the communication terminal 3a received in step 62 as search keys (step S63-1).

Next, the determination part 54 determines whether the respective terminal IDs of the communication terminal 3b and the communication terminal 3a are associated with one another as a communication source and a communication destination and managed in the same record (step S63-2). In a case where the determination part 54 determines that these communication terminals have been associated with one another as a communication source and a communication destination and managed in the same record (YES), the process of step 63 ends.

However, in a case where the determination part 54 determines that these communication terminals are not managed as being associated with one another as a communication source and a communication destination in the same record (NO), the storing and reading part 59 outputs data of a communication not possible screen page (i.e., a remote control not possible screen page) previously stored in the storage part 5000 (step S63-4). In this case, returning to FIG. 18, the transmitting and receiving part 51 transmits, to the communication terminal 3b, request result information that includes data of a request result screen page and indicates that communication is not possible (step S64). Thus, the transmitting and receiving part 31 of the communication terminal 3b receives the request result information. In this case, in step S71 that will be described later, the display control part 33 of the communication terminal 3b displays the remote control not possible screen page s4 such as the screen page illustrated in FIG. 20A on the display 317.

Hereinafter, the description will be continued for a case where the determination part 54 determines that the communication terminals are associated with one another as a communication source and a communication destination and managed in the same record (YES in step S63-2).

As illustrated in FIG. 18, the storing and reading part 59 searches the state management table with the use of the terminal ID of the communication terminal 3a that is the communication destination, received in step S62, to retrieve the IP address of the corresponding communication terminal 3a (step S65). Then, the transmitting and receiving part 51 transmits, to the communication terminal 3a identified by the IP address retrieved in step S65, a communication start request (i.e., a remote control start request) (step S66). The communication start request includes the terminal ID of the communication terminal 3b that is the request source and the terminal ID of the communication terminal 3a that is the request destination. Thus, the transmitting and receiving part 31 of the communication terminal 3a receives the communication start request.

Next, the short-range communication part 38 of the communication terminal 3a prepares for remote control to cause the photographing apparatus 10 to start capturing an image of a subject, a scene, or the like (step S67). As a result, the transmitting and receiving part 31 of the communication terminal 3a transmits, to the service providing system 5, a request result responsive to the communication start request (i.e., a result indicating that the preparation has been completed) (step S68). Thus, the transmitting and receiving part 51 of the service providing system 5 receives the request result.

Next, the storing and reading part 59 of the service providing system 5 outputs previously stored data of a communication possible screen page (i.e., a remote control possible screen page s5) (step S69). Then, the transmitting and receiving part 51 transmits, to the communication terminal 3b that is the request source of step S62, request result information that includes the data of the communication possible screen page and indicates that communication is possible (step S70). Thus, the transmitting and receiving part 31 of the communication terminal 3b receives the request result information.

Figure 20A:
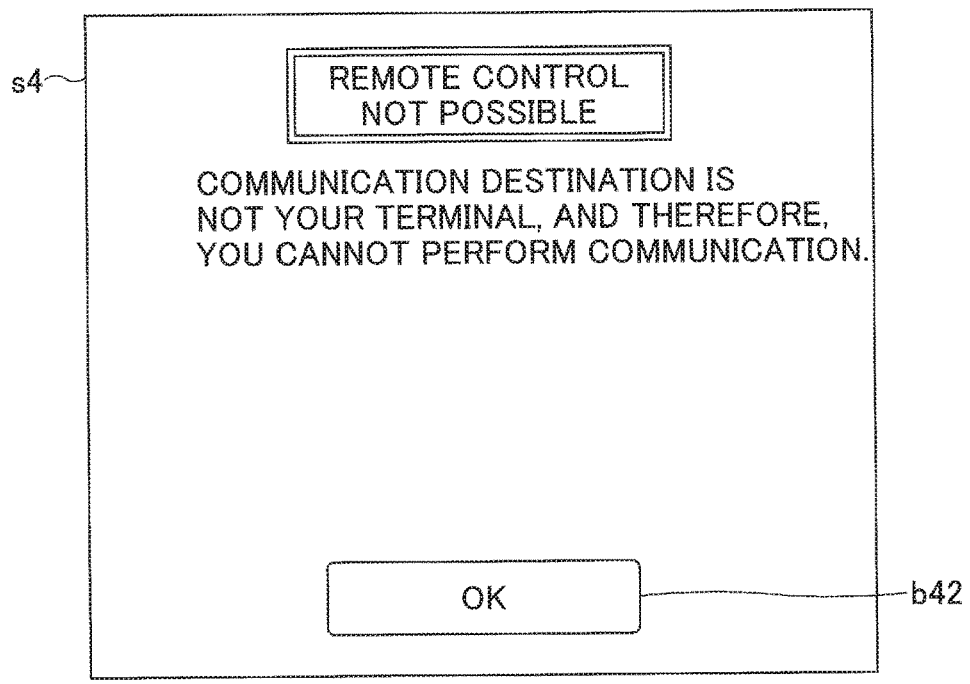
FIG. 20A illustrates one example of a displayed request result screen page (1/2).
Figure 20B:
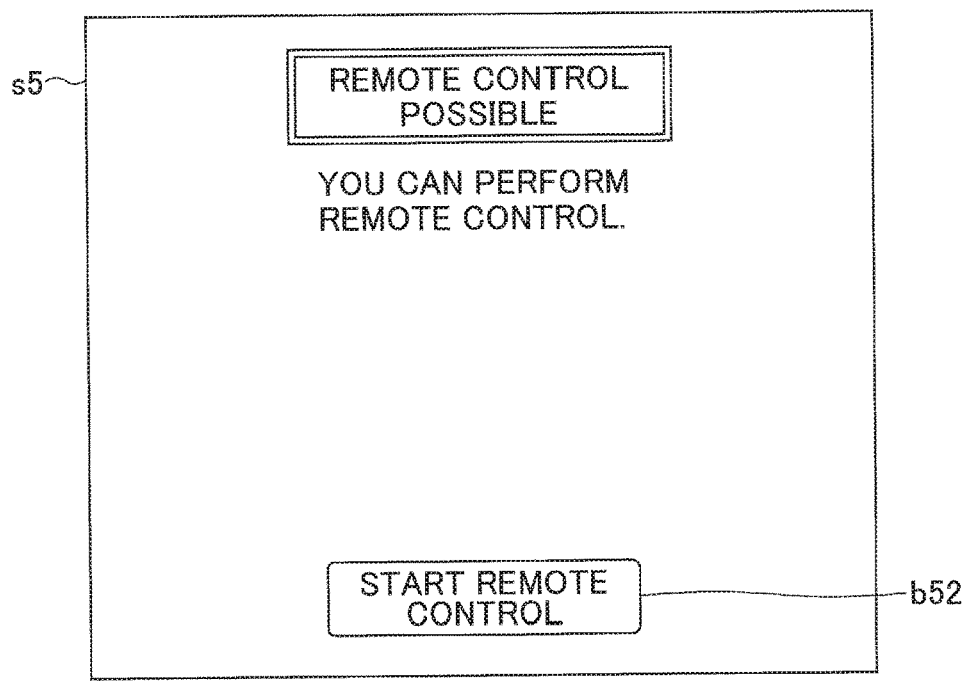
FIG. 20B illustrates one example of a displayed request result screen page (2/2).

Next, the display control part 33 of the communication terminal 3b displays the remote control possible screen page s5 such as the screen page illustrated in FIG. 20B on the display 317. Note that the remote control not possible screen page s4 illustrated in FIG. 20A indicates that the communication destination is not the communication terminal of the user of the request source and therefore the user cannot perform communication. The remote control not possible screen page s4 includes an "OK" button b42 for the user understanding the displayed screen page s4, to close the remote control not possible screen page s4. In contrast, the remote control possible screen page s5 illustrated in FIG. 20B indicates that the user can perform communication, because the communication terminal 3a of the request destination is the communication terminal of the user of the request source. The remote control possible screen page s5 further includes a "START REMOTE CONTROL" button b52 for the user to actually start remote control. In response to the user's pressing the "START REMOTE CONTROL" button b52, the communication terminal 3a, for example, comes to be able to perform remote control of the photographing apparatus 10 such as to start and end capturing an image.

Figure 21:
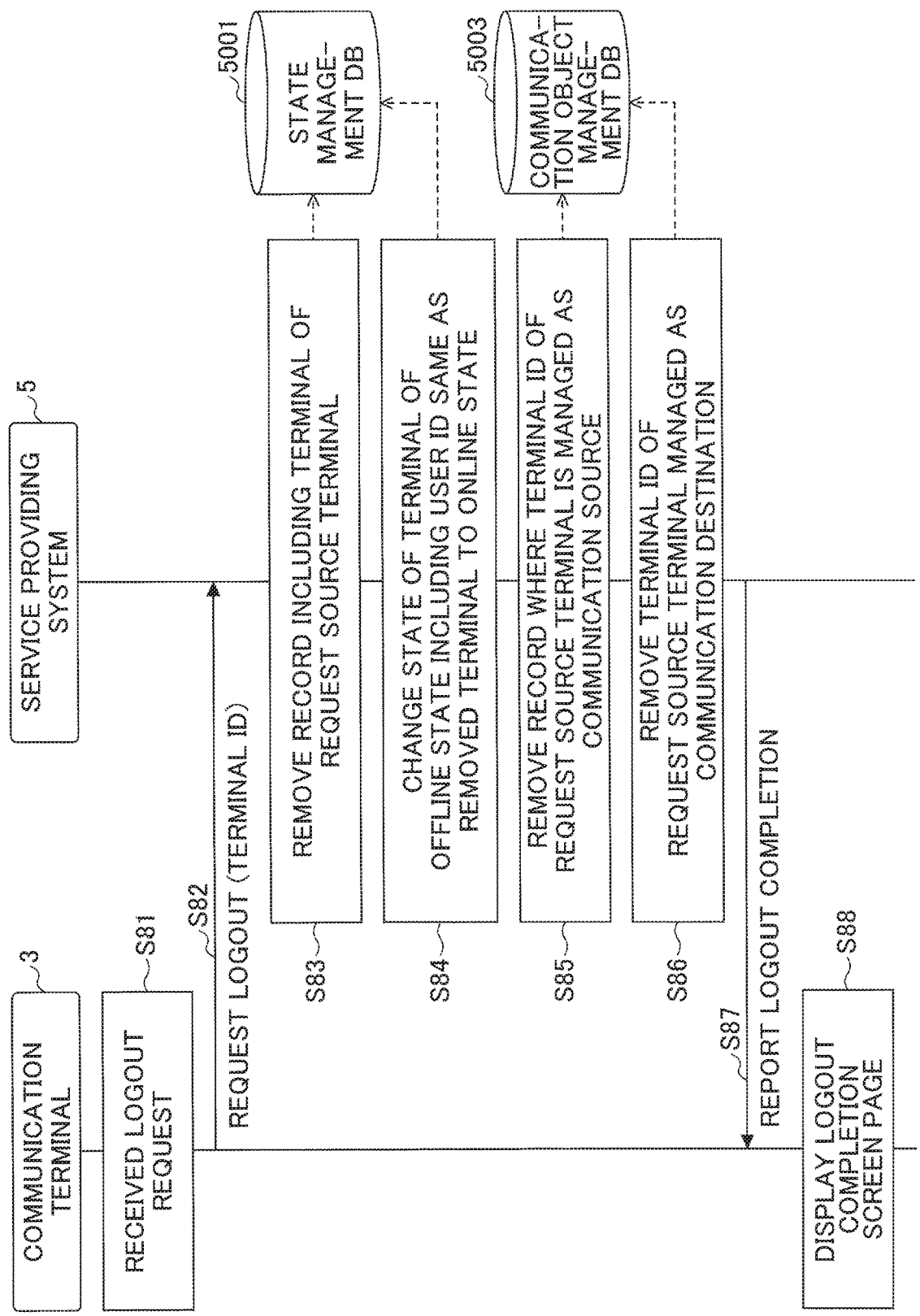
FIG. 21 is a sequence diagram illustrating one example of a logout process.
Figure 22A:
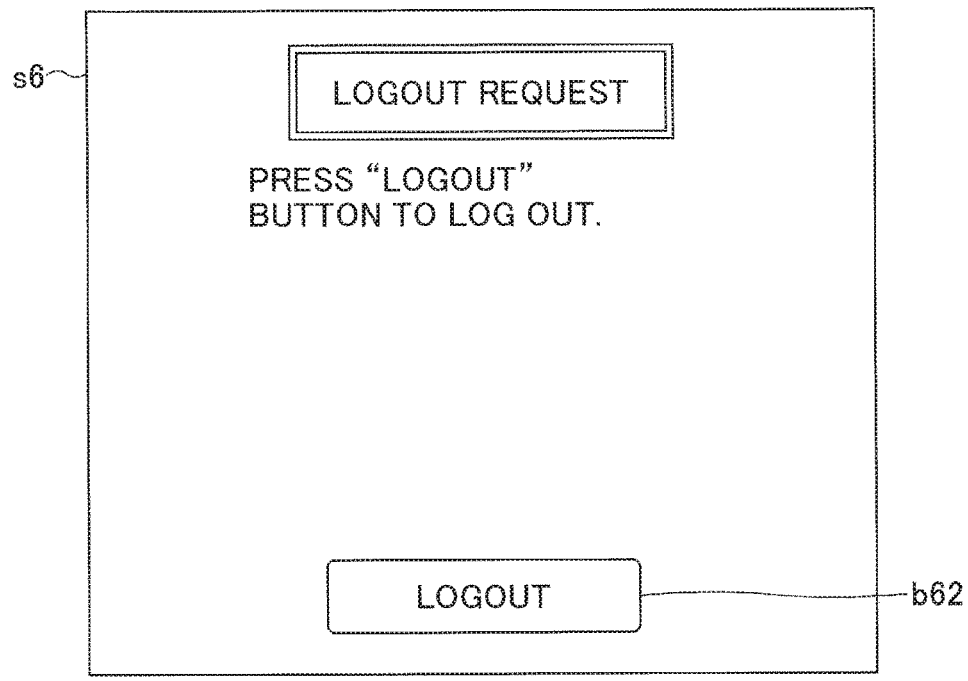
FIG. 22A illustrates one example of a displayed logout screen page (1/2).
Figure 22B:
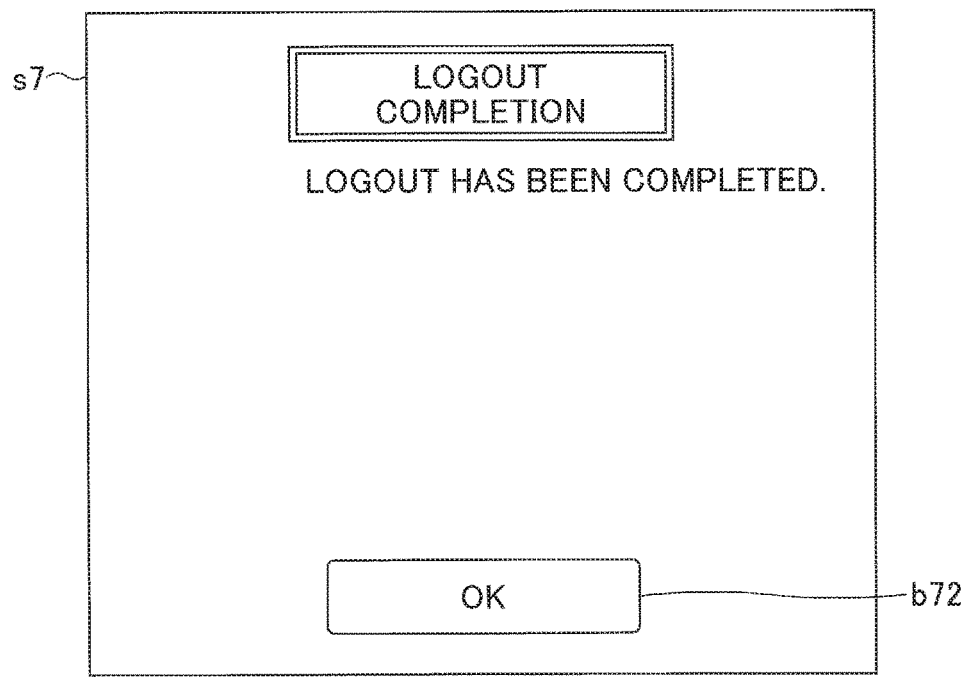
FIG. 22B illustrates one example of a displayed logout screen page (2/2).

Next, with the use of FIGS. 21, 22A, and 22B, a process where a communication terminal 3 requests a service providing system 5 to log out will be described. FIG. 21 is a sequence diagram illustrating one example of a logout process. FIGS. 22A and 22B illustrate examples of logout screen pages. Note that a logout screen page can be displayed on the display 317 in response to, for example, the user of a communication terminal 3 performing a predetermined operation on the communication terminal 3.

As illustrated in FIG. 21, in response to the user pressing a "LOGOUT" button b62 included in a logout request screen page s6 (see FIG. 22B) displayed on the display 317 by the display control part 33 of a communication terminal 3, the receiving part 32 receives the logout request (step S81).

Next, the transmitting and receiving part 31 transmits to a service providing system 5 a logout request (step S82). The logout request includes the terminal ID of the communication terminal 3 of the request source. Thus, the transmitting and receiving part 51 of the service providing system 5 receives the logout request.

Next, the removing part 55 of the service providing system 5 removes from the state management table the record that includes the terminal ID of the communication terminal 3 that is the request source (step S83). Further, in a case where the communication state information, associated with a terminal ID that includes the same user ID as the user ID included in the terminal ID included in the record that is thus removed by the removing part 55, indicates an offline state, the storing and reading part 59 changes the communication state information from offline to online and manages the changed communication state information in the state management table (step S84). Note that in a case where there are a plurality of pieces of communication state information having offline states associated with the terminal IDs including the same user IDs as the user ID of the terminal ID included in the record thus removed by the removing part 55 in the communication state management table, the storing and reading part 59 changes the piece of the communication state information to online according to the order of the transmitting and receiving part 51 receiving the login requests from the respective communication terminals 3. For example, in a case of the state management table illustrated in FIG. 8, in response to a record including a terminal ID being removed, the communication state information of offline (1) associated with a terminal ID including the same user ID included in the terminal ID of the removed record is changed to online. Then, in response to a record including a terminal ID having the same user ID being removed subsequently, the communication state information of offline (2) associated with a terminal ID including the same user ID included in the terminal ID of the removed record is changed to online.

Thus, communication state information of a communication terminal 3 once managed with the communication state information of offline as a result of the upper limit of the permissible number of communication terminals of the same user that the same user can use to perform communication among these communication terminals being exceeded is changed to online as a result of another communication terminal 3 of the same user logging out. As a result, communication by the communication terminal 3 for which the communication state information has been thus changed to online becomes possible.

Next, the removing part 55 removes from the communication object management table the record including the terminal ID of the communication terminal 3 of the request source managed in the "communication source" field (step S85). Further, the removing part 55 removes from the "communication destination" fields of the communication object management table the terminal ID of the communication terminal 3 of the request source (step S86).

Next, the transmitting and receiving part 51 transmits to the communication terminal 3 of the request source a logout completion report. Thus, the transmitting and receiving part 31 of the communication terminal 3 of the request source receives the logout completion report. Then, the display control part 33 of the communication terminal 3 of the request source displays on the display 317 a logout completion screen page s7 such as the screen page illustrated in FIG. 22B. The logout completion screen page s7 indicates that logout has been completed. The logout completion screen page s7 further includes an "OK" button b72 for the user understanding the contents of the displayed screen page s7 to close the logout completion screen page s7.

<<Main Advantageous Effects of Embodiment>>

Thus, according to the embodiment, a terminal ID includes a user ID (a to-be-authenticated section) and a not-to-be-authenticated section. Therefore, once a to-be-authenticated section and a password are registered; for a case where the user uses a plurality of communication terminals having differing not-to-be-authenticated sections, the user need not perform a plurality of registering operations for the respective communication terminals. Thus, troublesomeness to the user can be avoided.

Further, a service providing system 5 uses a method where, in the communication object management table, a plurality of terminal IDs that include a common user ID, i.e., a to-be-authenticated section, and identify differing communication terminals are associated with each other as respective terminal IDs of communication sources and communication destinations that can perform communication with the communication sources: this method makes the management easier. Further, as described above concerning a process such as step S63-2 of FIG. 19, communication is permitted only between communication terminals of the same user. Therefore, it is possible to prevent, for example, a user from freely performing remote control of a communication terminal of another user, and thus, security can be easily maintained.

Further, a service providing system 5 uses a method where, in the state management table, a terminal ID that includes a user ID is used to identify a communication terminal that has requested login and is associated with communication state information that indicates a communication state of the communication terminal and is managed; this method enables easier registration of a communication terminal to be used to receive a service. Further, as described above concerning a process such as step S46-2 of FIG. 16, the number of communication terminals, even though the communication terminals are communication terminals of the same user, permitted to perform communication with each other is limited to a predetermined number. Thus, according to a service providing system, not only it is possible to easily register communication terminals of users but also it is possible to reduce a load of a server system that provides a service.

Further, it is possible to easily achieve fairness among users (for example, it is possible to prevent a service providing system 5 from being used only by a certain user). According to the embodiment, as described above, even in a case where a user will use a plurality of communication terminals having differing not-to-be-authenticated sections, the user need not perform a registering operation for each of the communication terminals. Thus, troublesomeness to the user can be avoided. As a result, a user may log in many communication terminals to a service providing system 5 and generate many sessions to receive services by using these communication terminals. Even in such a situation, as a result of the number of communication terminals, even though the communication terminals are communication terminals of the same user, permitted to perform communication with each other being limited to a predetermined number as described above, it is possible to easily achieve fairness among users (for example, it is possible to prevent a service providing system 5 from being used only by a certain user).

Further, in the communication object management table, after communication terminals log in, a service providing system 5 automatically registers (see steps S46-5 and S46-6), as communication terminals that can perform communication with each other, only a plurality of terminal IDs of the same user for which communication state information is managed as online in the state management table (see step S46-3 of FIG. 16). Further, after a communication terminal logs out, a service providing system 5 automatically removes from the communication object management table (see steps S85 and S86 of FIG. 21) the terminal ID which is thus removed from the state management table (see step S83). By thus dynamically changing management of terminal IDs in the communication object management table in response to login and logout of the communication terminals, the user need not be aware of the communication object management table, and therefore, troublesomeness to the user for preparing for starting communication can be avoided.

Thus, the service providing systems, the service delivery systems, the service providing methods, and the non-transitory recording media have been described in the embodiment. However, the present invention is not limited to the embodiment, and various modifications and improvements can be made within the scope of the present invention.

[First Variant]

In the above-described embodiment, in step S25 of FIG. 13, the user inputs a terminal ID and a password. However, an embodiment is not limited to this method. For example, in a case where a communication terminal does not display a screen page for the user to input information as in a case where the communication terminal is an electric component, a terminal ID and a password previously stored in the communication terminal are transmitted to a service providing system in step S26. As a method to previously store a terminal ID and a password in a communication terminal, a method in which the terminal ID and the password are transmitted from another PC to the communication terminal through a communication network; a method in which a recording medium (a SIM card or the like) in which the terminal ID and the password are recorded is inserted in the communication terminal and the terminal ID and the password are transmitted to the communication terminal from the recording medium; and so forth can be cited.

DESCRIPTION OF REFERENCE SIGNS 1 service delivery system
3 communication terminal
3a communication terminal (one example of a second communication terminal)
3b communication terminal (one example of a first communication terminal)
3c communication terminal
5 service providing system
5a service providing system
5b service providing system
7 authentication system
7a authentication system
7b authentication system
7c authentication system
9 communication network
10 photographing apparatus
51 transmitting and receiving part (one example of a receiving part and one example of a transmitting part)
52 authentication part (one example of an authentication part)
53 search part (one example of a search part)
54 determination part (one example of a determination part)
55 removing part (one example of a removing part)
59 storing and reading part
5000 storage part
5001 state management DB (one example of a state management part)
5002 authentication system management DB
5003 communication object management DB (one example of a communication object management part)

RELATED ART DOCUMENT

Patent Document

Patent Document 1: Japanese Unexamined Patent Application Publication No. 2015-201827

What is claimed is:

1. A service providing system for providing a service to a communication terminal, the service providing system comprising:

a processor configured to associate with one another a plurality of pieces of terminal identification information for identifying different user communication terminals common to a same user and to manage the plurality of pieces of terminal identification information, each of the plurality of pieces of terminal identification information including user identification information having a to-be-authenticated section used to authenticate a terminal identification of the user and is common to the plurality of pieces of terminal identification information and a not to-be-authenticated section not to be used to authenticate the terminal identification of the user, the processor being further configured to manage and associate the plurality of pieces of terminal identification information with one another as a piece of terminal identification information for a communication source and a piece of terminal management information for a communication destination that can perform communication with the communication source;

to receive from a first communication terminal as a communication source a first piece of terminal identification information for identifying the first communication terminal and a second piece of terminal identification information for identifying a second communication terminal as a communication destination; and in response to receiving the first piece of terminal identification information and the second piece of terminal identification information, to transmit a request to the second communication terminal to start communication with the first communication terminal thereby allowing control of the second communication terminal from the first communication terminal for a case where the first piece of terminal identification information and the second piece of terminal identification information are managed and associated with one another and not to transmit a request to the second communication terminal to start communication with the first communication terminal for a case where the first piece of terminal identification information and the second piece of terminal identification information are not managed as being associated with one another.

2. The service providing system according to claim 1, wherein the processor is further configured to, for a case where the first piece of terminal identification information and the second piece of terminal identification information are not managed as being associated with one another, transmit to the first communication terminal request result information indicating that communication with the second communication terminal is not possible.

3. The service providing system according to claim 1, wherein the processor is further configured to when receiving a login request from a communication terminal, receive a piece of terminal identification information for identifying the communication terminal, and for a case where the piece of terminal identification information includes user identification information the same as user identification information of another piece of terminal identification information for identifying another communication terminal already managed, associate the piece of terminal identification information of the communication terminal that has transmitted the login request as a piece of terminal identification information for a communication source with the another piece of terminal identification information as a piece of terminal identification information for a communication destination and manage the pieces of terminal identification information.

4. The service providing system according to claim 3, wherein the processor is further configured to associate the piece of terminal identification information of the communication terminal that has transmitted the login request as a piece of terminal identification information for a communication destination with the another piece of terminal identification information as a piece of terminal identification information for a communication source and manages the pieces of terminal identification information.

5. The service providing system according to claim 1, wherein the processor is further configured to remove from being managed, in response to receiving a logout request from a communication terminal, a record where a piece of terminal identification information for identifying the communication terminal is managed as a piece of terminal identification information for a communication source.

6. The service providing system according to claim 5, wherein the processor is further configured to further remove from managing objects, in response to receiving the logout request, a piece of terminal identification information for identifying the communication terminal that has transmitted the logout request, the piece of terminal identification information having been managed as a piece of terminal identification information for a communication destination.

7. The service providing system according to claim 1, wherein the communication terminal is a mobile terminal, an information processing terminal, a business machine, a home appliance, an electric component, a medical device, or an industrial device.

8. A service delivery system comprising:

the service providing system according to claim 1; and communication terminals.

9. A service providing method executed by a service providing system that, at a time of providing a service to a communication terminal, causes an authentication system to authenticate a user of the communication terminal, the service providing method comprising:

associating with one another by a processor a plurality of pieces of terminal identification information for identifying different communication terminals common to a same user and managing the plurality of pieces of terminal identification information, each of the plurality of pieces of terminal identification information including user identification information having a to-be-authenticated section to be used to authenticate a terminal identification of the user and is common to the plurality of pieces of terminal identification information and a not to-be-authenticated section not to be used to authenticate the terminal identification of the user, the processor managing and associating the plurality of pieces of terminal identification information with one another as a piece of terminal identification information for a communication source and a piece of terminal identification information for a communication destination that can perform communication with the communication source;

receiving by a processor from a first communication terminal as a communication source a first piece of terminal identification information for identifying the first communication terminal and a second piece of terminal identification information for identifying a second communication terminal as a communication destination; and in response to receiving the first piece of terminal identification information and the second piece of terminal identification information, transmitting by a processor a request to the second communication terminal to start communication with the first communication terminal thereby allowing control of the second communication terminal from the first communication terminal for a case where the first piece of terminal identification information and the second piece of terminal identification information are managed and associated with one another and not transmitting a request to the second communication terminal to start communication with the first communication terminal for a case where the first piece of terminal identification information and the second piece of terminal identification information are not managed as being associated with one another.

10. A non-transitory recording medium storing a program that causes a processor to execute the service providing method according to claim 9.

11. The service providing system according to claim 1, wherein the processor is further configured to output previously stored data of a communication possible screen page.

* * * * *